US00RE41033E

(19) United States
(12) Reissued Patent
Ueda et al.

(10) Patent Number: US RE41,033 E
(45) Date of Reissued Patent: Dec. 8, 2009

(54) PEARLITIC STEEL RAIL HAVING EXCELLENT WEAR RESISTANCE AND METHOD OF PRODUCING THE SAME

(75) Inventors: Masaharu Ueda, Kitakyushi (JP); Hideaki Kageyama, Kitakyushi (JP); Kouichi Uchino, Kitakyushi (JP); Koji Babazono, Kitakyushi (JP); Ken Kutaragi, Kitakyushi (JP)

(73) Assignee: Nippn Steel Corporation, Tokyo (JP)

(21) Appl. No.: 11/561,654

(22) PCT Filed: Nov. 13, 1995

(86) PCT No.: PCT/JP95/02312

§ 371 (c)(1),
(2), (4) Date: Jul. 15, 1996

(87) PCT Pub. No.: WO96/15282

PCT Pub. Date: May 23, 1996

Related U.S. Patent Documents

Reissue of:
(64) Patent No.: 5,762,723
Issued: Jun. 9, 1998
Appl. No.: 08/676,159
Filed: Jul. 15, 1996

U.S. Applications:
(63) Continuation of application No. 10/974,048, filed on Oct. 26, 2004, now Pat. No. Re. 40,263.

(30) Foreign Application Priority Data

| | | |
|---|---|---|
| Nov. 15, 1994 | (JP) | 6-280916 |
| Mar. 7, 1995 | (JP) | 7-046753 |
| Mar. 7, 1995 | (JP) | 7-046754 |
| Oct. 18, 1995 | (JP) | 7-270336 |

(51) Int. Cl.
*C21D 1/84* (2006.01)
*C21D 9/04* (2006.01)

(52) U.S. Cl. ..... 148/581; 148/584; 148/320

(58) Field of Classification Search ..... None
See application file for complete search history.

(56) References Cited

U.S. PATENT DOCUMENTS 4,082,577 A 4/1978 Heller (Continued)

FOREIGN PATENT DOCUMENTS

DE 2148722 9/1971

(Continued)

OTHER PUBLICATIONS

American Railway Engineering Association, Manual for Railway Engineering, Chapter 4, Rail, pp. i and 4–2–2, 1993 Edition.

(Continued)

*Primary Examiner*—George Wyszomierski
(74) *Attorney, Agent, or Firm*—Birch, Stewart, Kolasch & Birch, LLP

(57) ABSTRACT

This invention is directed to improve a wear resistance and a damage resistance required for a rail of a sharply curved zone of a heavy load railway, comprising more than 0.85 to 1.20% of C, 0.10 to 1.00% of Si, 0.40 to 1.50% of Mn and if necessary, at least one member selected from the group consisting of Cr, Mo, V, Nb, Co and B, and retaining high temperature of hot rolling or a steel rail heated to a high temperature for the purpose of heat-treatment, the present invention provides a pearlitic steel rail having a good wear resistance and a good damage resistance, and a method of producing the same, wherein a head portion of the steel rail is acceleratedly cooled at a rate of 1° to 10° C./sec from an austenite zone temperature to a cooling stop temperature of 700° to 500° C. so that the hardness of the head portion is at least Hv 320 within the range of a 20 mm depth.

11 Claims, 11 Drawing Sheets

U.S. PATENT DOCUMENTS

| | | | | | |
|---|---|---|---|---|---|
| 4,375,995 | A | | 3/1983 | Sugino et al. | |
| 4,486,243 | A | | 12/1984 | Lambert et al. | |
| 4,759,806 | A | * | 7/1988 | Dambre | 148/596 |
| 4,886,558 | A | | 12/1989 | Teramoto et al. | |
| 5,170,932 | A | * | 12/1992 | Blumauer | 228/189 |
| 5,209,792 | A | | 5/1993 | Besch et al. | |
| 5,658,400 | A | | 8/1997 | Uchino et al. | |
| 5,762,723 | A | | 6/1998 | Ueda et al. | |

FOREIGN PATENT DOCUMENTS

| | | | |
|---|---|---|---|
| DE | 2919156 | | 11/1979 |
| EP | 0186373 | | 12/1985 |
| EP | B0186373 | | 9/1990 |
| EP | A0469560 | | 7/1991 |
| GB | 1370144 | | 10/1974 |
| GB | 1457061 | | 12/1976 |
| JP | 47007606 | | 4/1972 |
| JP | B5425490 | | 8/1979 |
| JP | 55-125231 | A | 9/1980 |
| JP | 57198216 | | 12/1982 |
| JP | B5919173 | | 5/1984 |
| JP | 62-056524 | A | 3/1987 |
| JP | 62127453 | | 6/1987 |
| JP | 62-127453 | A | 6/1987 |
| JP | 63-062846 | A | 3/1988 |
| JP | 5169292 | | 7/1993 |
| JP | 5295436 | | 11/1993 |
| JP | 5295448 | | 11/1993 |
| JP | A617193 | | 1/1994 |
| JP | 6017135 | | 1/1994 |
| JP | 6279925 | | 10/1994 |
| JP | 6279928 | | 10/1994 |
| JP | 6280916 | | 11/1994 |
| JP | 7046753 | | 3/1995 |
| JP | 7046754 | | 3/1995 |
| JP | 7270336 | | 10/1995 |
| JP | 8109439 | | 4/1996 |
| JP | 8109440 | | 4/1996 |
| JP | 7046753 | | 12/1999 |
| JP | 7046754 | | 5/2000 |
| WO | WO9402652 | | 2/1994 |
| WO | WO9517532 | | 6/1995 |

OTHER PUBLICATIONS

Masaharu Ueda et al., "Application of Hypereutectoid Steel to Heavy Haul Track Rail" Thermomechanical Processing and Mechanical Properties of Hypereutectoid Steels and Cast Irons, The Minerals, Metals & Materials Society, 1997, pp. 161–174.

Prosecution History of and Opposition Proceedings for European Patent Application No. 95936781.4 (corresponding to U.S. Appl. No. 5,762,723).

D.K. Nesterov et al., "Properties of Heat Treated Rails from Continuously Cast blooms of Hypereutecoid Steel", Steel in Translation, vol. 22, Apr. 1992, pp. 191–192.

K. Hulka et al., Niob als Mikrolegierungselement in eutektoiden Stahlen am Beispiel der Schienenstahle, 1984, pp. 25–34.

Stahlkunde fur Ingenieure, Springer–Verlag 1991, pp. 106, 108–119, 134.

Unzueta et al., "Microstructure and Wear Resistance of Pearlitic Rail Steels" Department of Engineering, University of Leicester, Wear, 162–164, 1993, pp. 173–182.

F.P.L. Kavishe et al., "Effect of Prior Austenite Grain Size and Pearlite Interlamellar Spacing on Strength and Fracture Toughness of a Eutectoid Rail Steel" Materials Science and Technology, by Aug. 1986, vol. 2, pp. 816–822.

B.D. Clarke et al., "Structure and Properties of Plain and Alloyed Ultrahigh Carbon Steel Wire Rod" Ironmaking and Steelmaking, 1991, vol. 18 No. 5, pp. 331–341.

Han et al., "Developments in Ultra–High Carbon Steels for Wire Rod Production Achieved Through Microalloying Additions" Department of Materials, Oxford University, vol. II, Sep. 1992, pp. 855–860.

S. Jaiswal., "Microalloyed High Carbon Steel Rod" Ironmaking and Steelmaking 1989, vol. 16, No. 1, pp. 49–54.

S. Jaiswal et al., "Metallurgy of Vanadium–Microalloyed, High–Carbon Steel Rod", Materials Science and Technology, Apr. 1985, vol. 1, pp. 276–284.

"Specification for the Quality Assurance of Electric–Flash Butt Welding of Rail" AREMA Manual for Railway Engineering, 1993.

Lankford, Jr. et al., "The Making, Shaping and Treating of Steel", United States Steel, Tenth Edition, 1985, pp. 1417, 1233–1237.

T. Gladman et al., "Some Aspects of the Structure–Property Relationships in High–Carbon Ferrite–Pearlite Steels", Journal of the Iron and Steel Institute, Dec. 1972, pp. 916–930.

Von Wilhelm Heller et al., "Stahle fur den Eisenbahn–Oberbau", 1985, pp. 594–602.

David A. Porter, "Phase Transformations in Metals and Alloys", Library of Congress Cataloging in Publication Data, 1981, pp. 332–335.

Eduard Houdremont, "Handbuch der Sonderstahikunde", Dritte verbesserte Auflage, vol. 1, 1956, p. 132.

Japan Metal Society, vol. 42, pp. 708–715.

A. Moser, "Herstellung von kopfgeharteten Schienen aus der Walzhitze", BHM, 133, vol. 7, 1988, pp. 321–326.

Flugge et al., "Gefuge und mechanische Eigenschaften von Schienenstahlen" Stahl und Eisen 99, No. 16, 1979, pp. 841–845.

Stahleisen Dusseldorf, "Herausgegeben vom Verein Deutscher Eisenhuttenleute und Max–Planck–Institut fur Eisenforschung GmbH" Archiv fur das Eisenhuttenwesen, 47 Oct. 1976, pp. 312–314.

D.K. Nesterov et al., "Heat Treatment if Rails for Use in Particularly Severe Service Conditions" Steel in the USSR, vol. 19, Jul. 1989, pp. 312–314.

D.K. Nesterov et al., "Hardening of Rails of a Hypereutectic Steel by Combined Heat Treatment", Metal Science and Heat Treatment Technology, vol. 31, No. 11–1, 1989, pp. 857–861.

R.W. Cahn, "the Microstructure Medium/High Carbon Steels" Constitution and properties of Steel, Weinheim VCH, 1992, pp. 402–432.

English language translation of the Official Action for Japanese Patent Application No. 07–046753, dated Dec. 21, 1999.

English language translation of the Official Action for Japanese Patent Application No. 07–046754, dated May 9, 2000.

Grounds of appeal submitted to the European Patent Office with respect to corresponding EP Patent 754775, which is the counterpart European patent of U.S. 5,762,723, Oct. 28, 2004.

American Railway Engineering Association, Manual for Railway Engineering, Part 2, Specifications, Specifications for Steel Rails, pp. 4–2–1 to 4–2–5, 1979 Edition with revisions dated 1981.
English translation of JP–63–062846–A, published Mar. 19, 1988.
English translation of JP–62–127453–A, published Jun. 9, 1987.
English translation of JP–55–125231–A, published Sep. 26, 1980.
English translation of JP–57–198216–A, published Dec. 4, 1982.
English translation of JP–62–056524–A, published Mar. 12, 1987.

* cited by examiner

RAIL STEEL OF THIS INVENTION (No. 8)
$\lambda$ = 0.77 nm
Rc = 0.19

PEARLITIC STEEL RAIL HAVING EXCELLENT WEAR RESISTANCE AND METHOD OF PRODUCING THE SAME

Matter enclosed in heavy brackets [ ] appears in the original patent but forms no part of this reissue specification; matter printed in italics indicates the additions made by reissue.

*CROSS-REFERENCE TO RELATED APPLICATION(S)*

*The present application is a continuation of U.S. patent application Ser. No. 10/974,048 filed Oct. 26, 2004, which is a reissue application of U.S. Pat. No. 5,762,723 which issued on Jun. 9, 1998. The entire disclosures of the application and U.S. Patent referenced above are incorporated herein by reference.*

TECHNICAL FIELD

This invention relates to a pearlitic steel rail which improves the wear resistance and breakage resistance that are required for rails at curved zones of heavy load railways, and drastically improves the service life of the rails, and a method of producing such rails.

BACKGROUND ART

Attempts have been made to improve a train speed and loading as one of the means for accomplishing higher efficiency of railway transportation. Such as improvement in efficiency of railway transportation means severe use of the rails, and a further improvement in the rail materials has become necessary. More concretely, wear drastically increases in the rails laid down in a curved zone of a heavy load railway and produces a problem from the aspect of longer service life of the rails.

However, high strength (high hardness) rails using eutectoid carbon steels and exhibiting a fine pearlite structure have been developed due to the recent improvements in high-strength rail heat-treatment technology as described below, and rail life in the curved zones in the heavy load railway has been remarkably improved.

(1) Heat-treated rails for ultra-heavy load having a sorbite structure of a fine pearlite structure at the head portion thereof (Japanese Examined Patent Publication (Kokoku) No. 54-25490);

(2) Production method for low alloy heat-treated rails which improves not only the wear resistance but also the drop of hardness at a weld portion by adding an alloy such as Cr, Nb, etc. (Japanese Examined Patent Publication (Kokoku) No. 59-19173); and (3) Production method for a high strength rail of at least 130 kgf/mm$^2$ produced by conducting accelerated cooling between 850° C. to 500° C. at a rate of 1° to 4° C./sec after rolling is completed or from a re-heated austenite zone temperature.

The characterizing feature of these rails is that they are high strength (high hardness) rails exhibiting the fine pearlite structure of eutectoid carbon-containing steel, and the rails are directed to improve the wear resistance.

In recent heavy load railways, however, an improvement in an axial load of cargos (the increase of train loading) has been strongly promoted so as to further improve railway transportation efficiency. In the case where the rails are sharply curved, the wear resistance cannot be secured even when the rails developed as described above are used, and the drop of rail life due to the wear has become a serious problem. With such a background, the development of rails having a higher wear resistance than that of the existing eutectoid carbon steels has been required.

The contact state between the wheel and the rail is complicated. Particularly, the contact state of the wheels is very different at the inner track rail compared to the outer track rail of the curved zone. On the outer track rail of the sharply curved zone of the heavy load railway, for example, the wheel flange is strongly pushed to the gage corner portion by the centrifugal force and receives sliding contact. On the head top portion of the inner track rail of the curved zone, on the other hand, the rail receives great slipping contact having large contact surface pressure from the wheel. As a result, in the case of the high strength wear-resistant rails according to the prior art wherein the head surface hardness is uniform inside the cross-section of the rail head portion, wear is promoted far more at the gage corner portion which receives the sliding contact of the outer track rail than the head top portion which receives the slipping contact of the inner track rail. On the other hand, the progress of the wear is always slower at the head top portion of the inner track rail than at the gage corner portion, and the contact surface pressure from the wheel is always maximal. Therefore, fatigue damage builds up on the head top surface before it is worn out.

The contact state with the wheels tends to the state described above in the high strength wear-resistant rails having uniform wear characteristics at the rail head portion according to the prior art, particularly on the inner track rail of the curve zone. Therefore, if fitting of the rail to the wheel is not quick at the initial wear state immediately after the laying of the rail, a local and excessive contact surface pressure consecutively acts on the rail and surface damage due to fatigue is likely to occur. In addition, even after fitting is established between the rail and the wheel, a large contact surface pressure always acts on the head top portion and consequently, surface damage similar to so-called "head check", which generally occurs at the gage corner portion, develops with plastic deformation because the wear is less.

To cope with this problem, there is a method which cuts off the surface layer of the rail head top portion before the rolling fatigue layer is built up. Because the cutting work requires a long time and is expensive, the following rail has been developed.

(4) A high strength and damage-resistant rail exhibiting the fine pearlite structure of eutectoid carbon-containing steel wherein a difference of hardness is provided so that the hardness of the gage corner portion is higher than that of the top head portion in the sectional hardness distribution of the rail head portion, in order to secure the wear resistance equal to that of the conventional high strength wear-resistant rails having a uniform head surface hardness in the cross-section at the gage corner portion, and to reduce the maximum surface pressure (to increase the contact area) by reducing the hardness at the head portion and to improve the surface damage resistance due to the wear promotion action (Japanese Unexamined Patent Publication (Kokai) No. 6-17193).

However, higher axial load of cargos (increase of railway loading) has been vigorously promoted in recent years so as to attain higher efficiency of railway transportation, and even when the rails developed as described above are used, sufficient wear resistance cannot be secured at the gage corner portions of the outer track rail even though they can prevent the surface damage by the periodically grinding of the head top portion in the inner track rail at the sharply curved zone, and the drop of rail life due to wear has been a serious problem.

DISCLOSURE OF THE INVENTION

The pearlite structure of the eutectoid carbon component, that has been used in the past as the rail steel, has a lameller structure comprising a ferrite layer having a low hardness and a tabular hard cementite layer. As a result of observation of the wear mechanism of the pearlite structure, the inventors of the present invention have confirmed that the soft ferrite structure is first squeezed out due to repetitive passage of the wheels, and only hard cementite is then built up immediately below the rolling surface, and work hardening adds to the former, thereby securing wear resistance.

Therefore, the present inventors have found out through a series of experiments that the wear resistance can be drastically improved by increasing the hardness of the pearlite structure to obtain a higher wear resistance, increasing at the same time the carbon content so as to increase the ratio of the hard tabular cementite layer and then increasing the cementite density immediately below the rolling surface.

Further, the inventors of the present invention have paid specific attention to the increase in the carbon content which directly affects the improvement of the wear resistance, and have developed a heat-treatment method for stably obtaining a pearlite structure in the hypereutectoid steel. FIG. 1 is a diagram showing the results of comparison of the wear resistance between the eutectoid steel and the hypereutectoid steel on an experimental basis. The present inventors have found out that the wear resistance can be drastically improved in the hypereutectoid steel by an increase in the carbon content at the same hardness (strength). The noteworthy point of this heat-treatment method resides in that when the carbon content is increased, the pearlitic transformation nose (start) moves towards the short time area much more than in the eutectoid steel component materials and the pearlite transformation is more likely to occur, as shown in FIG. 2 which is a continuous cooling transformation diagrams of the eutectoid steel and the hypereutectoid steel. In other words, the present inventors have found out that in order to obtain a high strength in the heat-treatment of the hypereutectoid steel rails, an accelerated cooling rate must be increased much more than in the conventional eutectoid component steels. In order to prevent the formation of the proeutectic cementite which causes brittleness as another problem of the hypereutectoid steel, the improvement of the accelerated cooling rate is effective. As a result, the present inventors have found out that the improvement in the wear resistance due to a higher carbon content can be expected by preventing the formation of the pro-eutectic cementite of the austenite grain boundary.

Further, the present inventors have experimentally confirmed that the wear resistance of the gage corner portion, which has been a problem in the conventional rail of the eutectoid carbon-containing steel which provides a difference in the hardness inside the section of the head portion, can be further improved by forming the difference in the hardness at the rail head portion having the pearlite structure with the increased carbon content described above in such a manner that the hardness of the gage corner portion becomes higher than that of the head top portion, fitting between the wheels and the rails under the initial wear state can be promoted at the same time by reducing the contact surface pressure and the wear of the head top porion, and buildup of the rolling fatigue layer can thus be prevented. The effect brought forth by setting the hardness of the head top portion to a lower level than the hardness of the gage corner portion is that the cutting work becomes easier when rail head profile grinding is conducted so as to prevent the local wear of the gage corner portion of the outer track rail and to prevent the internal fatigue damage due to the stress concentration on the inside of the corner portion as has been periodically conducted on heavy load railways. This effect can be similarly obtained when cutting of the head top portion of the inner track rail is conducted.

The present invention is directed to improve wear resistance and the damage resistance, as required for the rails of the sharply curved zone of the heavy load railway, to drastically improve the service life of the rails and to provide such rails at a reduced cost.

In the case of resistance flash butt welding which has gained a wide application in rail welding, the base metal portion having a high strength by heat-treatment is softened at the joint portion due to the heat-treatment to thereby invite a local wear, and the drop of the joint portion not only results in the source of occurrence of noise and vibration but also results in the damage of the road bed and breakage of the rails.

The present invention solves the problems described above, and has the gist thereof in the following points.

(1) A pearlitic steel rail, having a good wear resistance, comprising more than 0.85 to 1.20%, in terms of percentage by weight, of carbon, wherein the structure of the steel rail is a pearlite, a pearlite lamella space of the pearlite is not more than 100 nm, and a ratio of the cementite thickness to the ferrite thickness in the pearlite is at least 0.15.

(2) A pearlitic steel rail, having a good wear resistance, comprising more than 0.85 to 1.20%, in terms of percentage by weight, of carbon, and having a good wear resistance, wherein the structure within the range of a depth of 20 mm from the surface of a rail head portion of the steel rail with the surface of the head portion being the start point is the pearlite, a pearlite lamella space of the pearlite is not more than 100 nm, and a ratio of the cementite thickness to the ferrite thickness in the pearlite is at least 0.15.

(3) A pearlitic steel rail having a good wear resistance, comprising, in terms of percent by weight:

C: more than 0.85 to 1.20%

Si: 0.10 to 1.00%,

Mn: 0.40 to 1.50%, and the balance consisting of Fe and unavoidable impurities, wherein the structure of the steel rail is pearlite, a pearlite lammella space of the pearlite is not more than 100 nm, and a ratio of the cementite thickness to the ferrite thickness in the pearlite is at least 0.15.

(4) A pearlitic steel rail having a good wear resistance, comprising, in terms of percent by weight:

C: more than 0.85 to 1.20%,

Si: 0.10 to 1.00%,

Mn: 0.04 to 1.50%, and the balance consisting of Fe and unavoidable impurities, wherein the structure within the range of the depth of 20 mm from the surface of a head portion of the steel rail with the surface of the rail head portion being the start point is the perlite, a pearlite lamella space of the pearlite is not more than 100 nm, and a ratio of the cementite thickness to the ferrite thickness in the pearlite is at least 0.15.

(5) A pearlitic steel rail having a good wear resistance, comprising, in terms of percent by weight:

C: more than 0.85 to 1.20%,

Si: 0.10 to 1.00%,

Mn: 0.04 to 1.50%, at least one of the members selected from the group consisting of:

Cr: 0.05 to 0.50%,

Mo: 0.01 to 0.20%,

V: 0.02 to 0.30%,

Nb: 0.002 to 0.05%,

Co: 0.10 to 2.00%,

B: 0.0005 to 0.005%, and the balance consisting of Fe and unavoidable impurities, wherein the structure of the steel rail is pearlite, a pearlite lamella space of the pearlite is not more than 100 nm, and a ratio of the cementite thickness to the ferrite thickness in the pearlite structure is at least 1.15.

(6) A pearlitic steel rail having a good wear resistance, comprising, in terms of percent by weight:

C: more than 0.85 to 1.20%,

Si: 0.10 to 1.00%,

Mn: 0.40 to 1.50%, at least one of the members selected from the group consisting of:

Cr: 0.05 to 0.50%,

Mo: 0.01 to 0.20%,

V: 0.02 to 0.30%,

Nb: 0.002 to 0.05%,

Co: 0.10 to 2.00%,

B: 0.0005 to 0.005%, and the balance consisting of Fe and unavoidable impurities, wherein the structure of the steel rail within the range of the depth of 20 mm from the surface of a head portion of the steel rail with the surface of the rail head portion being the start point is the pearlite, a pearlite lamella space of the pearlite is not more than 100 nm, and a ratio of the cementite thickness to the ferrite thickness in the pearlite is at least 0.15.

(7) A pearlitic steel rail having a good weldability and a high wear resistance according to the item (1) or (2), wherein the difference between the hardness of a weld joint portion and a base metal is not more than Hv 30.

(8) A pearlitic steel rail having a good weldability and a good wear resistance according to any of the items (3) to (6), wherein the chemical components further satisfy the relation Si+Cr+Mn: 1.5 to 3.0% in terms of percent by weight.

(9) A method of producing a pearlitic steel rail having a good wear resistance, comprising the chemical components according to any of the items (1) to (6), which comprises the steps of hot rolling a melted and cast steel, acceleratedly cooling a steel rail holding a rolling heat immediately after hot rolling or a steel rail heated for the purpose of heat-treatment at a cooling rate of 1° to 10° C./sec from an austenite temperature, stopping accelerated cooling when the steel rail temperature reaches 700° to 500° C., and thereafter leaving the steel rail to cool, wherein the hardness within the range of the depth of 20 mm from the surface of a head portion of the steel rail is at least Hv 320.

(10) A method of producing a pearlitic steel rail having a good wear resistance, comprising the chemical components according to any of the items (1) to (6), which comprises the steps of hot rolling a melted and cast steel, acceleratedly cooling a steel rail holding a rolling heat immediately after hot rolling or a steel rail heated for the purpose of heat-treatment at a cooling rate of more than 10° to 30° C./sec from an austenite temperature, stopping accelerated cooling when pearlite transformation of the steel rail proceeds at least 70%, and thereafter leaving the steel rail to cool, wherein the hardness within the range of the depth of 20 mm from the surface of a head portion of the steel rail is at least Hv 320.

(11) A method of producing a pearlitic steel rail having a good wear resistance and a good damage resistance, comprising the chemical components according to any of the items (1) to (6), which comprises the steps of hot rolling a melted and cast steel, acceleratedly cooling a steel rail holding a rolling heat immediately after hot rolling or a gage corner portion of a steel rail heated for the purpose of heat-treatment at a cooling rate of 1° to 10° C./sec, from an austenite temperature, stopping accelerated cooling when the temperature of the gage corner portion of the steel rail reaches 700° to 500° C., and thereafter leaving the steel rail to cool, wherein the hardness of the gage corner portion of the steel rail is at least Hv 360 and the hardness of a head top portion is Hv 250 to 320.

(12) A method of producing a pearlitic steel rail having a good wear resistance and a good damage resistance, comprising the chemical components according to any of the items (1) to (6), which comprises the steps of hot rolling a melted and cast steel, acceleratedly cooling a steel rail holding a rolling heat immediately after hot rolling or a gage corner portion of a steel rail heated for the purpose of heat-treatment at a cooling rate of more than 10° to 30° C./sec from an austenite temperature, stopping accelerated cooling when a pearlite transformation of the gage corner portion of the steel rail proceeds at least 70%, and thereafter leaving the steel rail to cool, wherein the hardness of the gage corner portion of the steel rail is at least Hv 360 and the hardness of the head top portion is Hv 250 to 320.

(13) A method of producing a pearlitic steel rail having good weldability and a good wear resistance, according to the item (7) or (8), which comprises the steps of hot rolling a melted and cast steel, acceleratedly cooling a steel rail holding rolling heat immediately after hot rolling or a steel rail heated for the purpose of heat-treatment at a cooling rate of 1° to 10° C./sec from an austenite temperature, stopping accelerated cooling when the steel rail temperature reaches 700° to 500° C., and thereafter leaving the steel rail to cool, wherein the hardness within the range of the depth of 20 mm from the surface of a head portion of the steel rail is at least Hv 320.

BEST MODE FOR CARRYING OUT THE INVENTION

Figure 1:
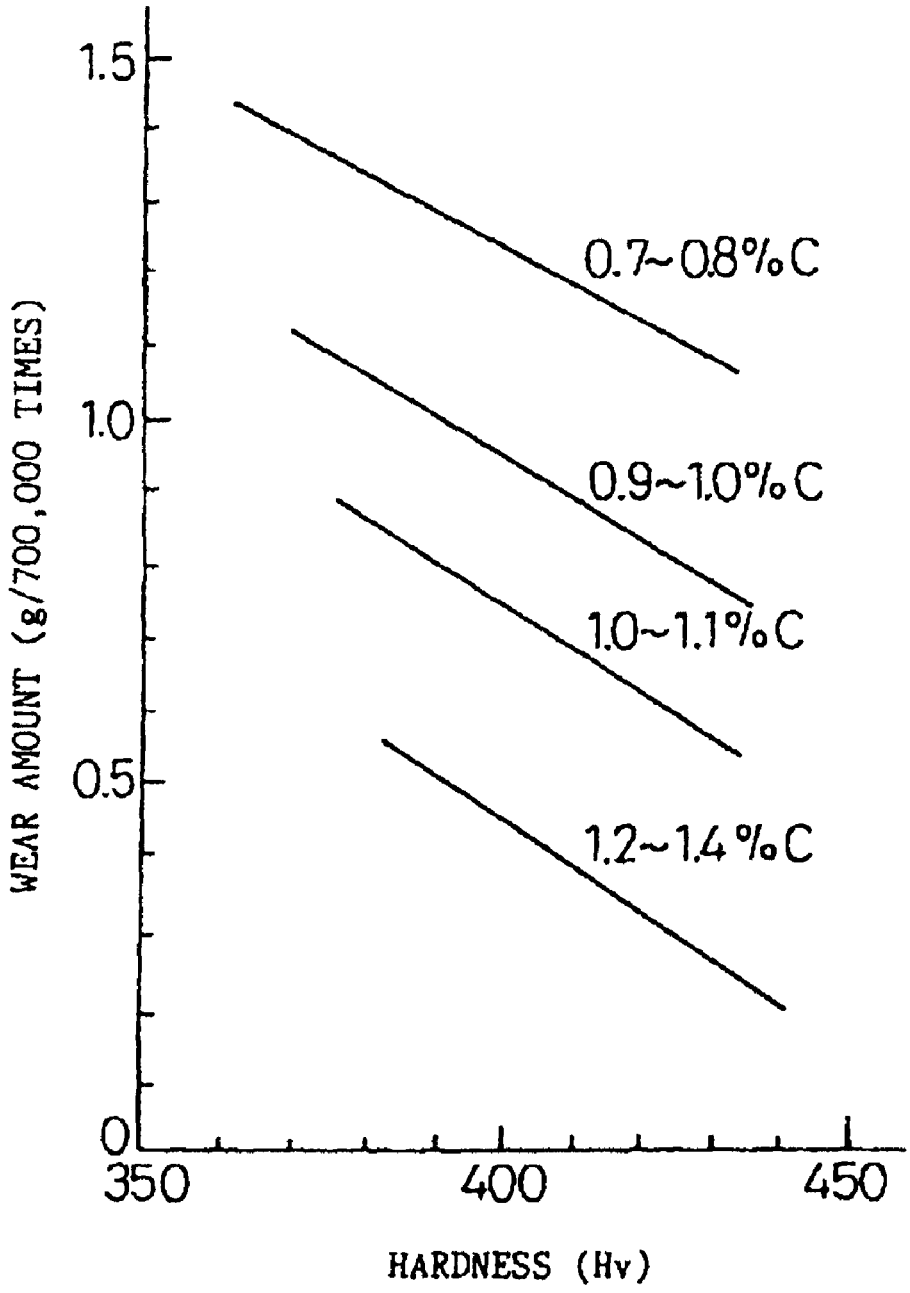
FIG. 1 is a diagram showing wear test characteristics, determined by a Nishihara wear tester, of a conventional eutectoid component pearlite rail and of a hypereutectoid component pearlite rail steel according to the present invention.

The pearlite structure of the eutectoid carbon component that has been used as the rail steel in the past has a lamella structure comprising a ferrite layer having a low hardness and a tabular hard cementite layer. A method of improving the wear resistance of the pearlite structure generally reduces the lamella space: $\lambda$ [$\lambda$=(ferrite thickness: $t_1$)+(cementite thickness: $t_2$)] and increases the hardness. As shown in FIG. 1 on page 1217 of Metallurgical Transactions, Vol. 7A (1976), for example, the hardness can be greatly improved by rendering the lamella space in the pearlite structure fine.

In the high hardness rails exhibiting the fine pearlite structure of eutectoid carbon steel, the hardness of the existing pearlite is the upper limit. When attempts are made to further make fine the pearlite lamella space by increasing the cooling rate in heat-treatment or by adding alloys, a hard martensite structure is formed inside the pearlite structure, so that both the toughness and the wear resistance of the rail drop.

Another solution method would be one that uses a material having a metallic structure which has a better wear resistance than that of the pearlite structure. In the case of rolling wear between the rails and the wheels, however, materials which are more economical and have a better wear resistance than the fine pearlite structure have not yet been found.

The wear mechanism of the pearlite structure is as follows. In the rail surface layer with which the wheel comes into contact, the work layer receiving repetitive contact with the wheel first undergoes plastic deformation in the opposite direction to the travelling direction of the train, and the soft ferrite layer sandwiched between the cementite plates is squeezed out and at the same time, the cementite plates are cut off upon receiving the work. Further, the cut cementite changes to spheres by receiving repeatedly the load of the wheel, and only the hard cementites are thereafter piled up immediately below the rolling surface of the wheel. In addition to work hardening by the wheel, the density of this cementite plays an important role in securing the wear resistance, and this fact is confirmed by experiment. Therefore, the inventors of the present invention make the pearlite lamella space fine in order to obtain the strength (hardness) and at the same time, increase the ratio of the tabular hard cementite structure which secures the wear resistance of the pearlite structure, by increasing the carbon content. In this way, the cementite becomes more difficult to be cut off even when receiving work and to become spheres. The present inventors have confirmed through experiments that the wear resistance can be drastically improved, without spoiling the toughness and ductility, by increasing the cementite density immediately below the rolling surface.

Hereinafter, the present invention will be explained in further detail.

To begin with, the reasons why the chemical components of the rail are limited as described above in the present invention will be explained.

Carbon is an effective element for generating the pearlite structure and securing the wear resistance. Generally, 0.60 to 0.85% of C is used for the rail steel. If the C content is not more than 0.85%, the ratio Rc ($Rc=t_2/t_1$) of the cementite thickness $t_2$ to the ferrite thickness $t_1$ in the pearlite structure, which secures the wear resistance, of at least 0.15 cannot be secured, and furthermore, the lamella space cannot be kept below 100 nm in the pearlite structure due to the drop of hardenability. If the C content exceeds 1.20%, the quantity of pro-eutectic cementite of the austenite grain boundary increases and both ductility and toughness greatly drop. Therefore, the C content is limited to the range of more than 0.85 to 1.20%.

Next, elements other than C will be explained.

Silicon is the element which improves the strength by solid solution hardening to the ferrite phase in the pearlite structure and, though limitedly, it improves toughness of the rail steel. If the Si content is less than 0.10%, its effect is not sufficient, and when the Si content exceeds 1.20%, it invites brittleness and a drop of weldability. Therefore, the Si content is limited to 0.10 to 1.20%.

Manganese is the element which similarly lowers the pearlite transformation temperature, contributes to a higher strength by increasing hardenability, and restricts the formation of the pro-eutectic cementite. If the Mn content is less than 0.40%, the effect is small and if it exceeds 1.50%, a martensite structure is likely to be formed at the segregation portion. Therefore, the Mn content is limited to 0.40 to 1.50%.

Further, at least one of the following elements is added, whenever necessary, to the rail produced by the component composition described above in order to improve the strength, the ductility and the toughness:

Cr: 0.05 to 0.50%,

Mo: 0.01 to 0.20%,

V: 0.02 to 0.30%,

Nb: 0.002 to 0.050%,

Co: 0.10 to 2.00%,

B: 0.0005 to 0.005%.

Next, the reasons, why the chemical components are stipulated as described above will be explained.

Chromium raises the equilibrium transformation point of pearlite and eventually contributes to the higher strength by making the pearlite structure fine. At the same time, it reinforces the cementite phase in the pearlite structure and improves the wear resistance. If the Cr content is less than 0.05%, the effect of Cr is small and if it exceeds 0.50%, the excessive addition of Cr invites the formation of the martensite structure and brittleness of the steel. Therefore, the Cr content is limited to 0.05 to 0.50%.

Molybdenum raises the equilibrium transformation point of pearlite in the same way as Cr and eventually contributes to the higher strength by making the pearlite structure fine. Mo also improves the wear resistance. If the Mo content is less than 0.01%, however, its effect is small and if it exceeds 0.20%, the excessive addition invites the drop of the pearlite transformation rate and the formation of the martensite structure which is detrimental to the toughness. Therefore, the Mo content is limited to 0.01 to 0.20%.

Vanadium improves the plastic deformation capacity by precipitation hardening due to vanadium carbides and nitrides formed during the cooling process at the time of hot rolling, restricts the growth of the austenite grains when heat-treatment is carried out at a high temperature to thereby make fine the austenite grains, reinforces the pearlite structure after cooling and improves the strength and the toughness required for the rail. If the V content is less than 0.03%, its effect cannot be expected and if it exceeds 0.30%, its effect again cannot be expected. Therefore, the V content is limited to 0.03 to 0.30%.

Niobium forms niobium carbides and nitrides in the same way as V and is effective for making the austenite grains fine. The austenite grain growth restriction effect of Ni lasts to a higher temperature (near 1200° C.) than V, and Nb improves the ductility and the toughness of the rail. If the Nb content is less than 0.002%, however, the effect of Nb cannot be expected and if it exceeds 0.050%, the excessive addition does not increase the effect. Therefore, the Nb content is limited to 0.002 to 0.050%.

Cobalt increases transformation energy of pearlite and improves the strength by making the pearlite structure fine. If the Co content is less than 0.10%, however, its effect cannot be expected and if it exceeds 2.00%, the excessive addition saturates. Therefore, the Co content is limited to 0.10 to 2.00%.

Boron provides the effect of restricting the proeutectic cementite resulting from the original austenite grain boundary, and is the effective element for stably forming the pearlite structure. If the B content is less than 0.0005%, however, its effect is weak and if the B content exceeds 0.0050%, coarse B compounds are formed and the rail properties are deteriorated. Therefore, the B content is limited to 0.0005 to 0.0050%.

In connection with the improvement in the weld portion, the present invention pays specific attention to Si, Cr and Mn as the rail components in order to prevent the drop of the hardness of the joint portion which occurs at the time of welding of the conventional rail steels at the time of flash butt welding, etc., in the hardness distribution of the weld joint portion. In other words, the drop of the hardness of the joint portion by flash butt welding, etc., brings the hardness of not greater than Hv 30 for the base metal, and if the Si+Cr+Mn value in this instance is less than 1.5%, the drop of the hardness of the weld joint portion cannot be prevented. If the Si+Cr+Mn value is greater than 3.0%, on the other hand, the martensite structure mixes into the weld joint portion, and the properties of the joint portion are deteriorated. Therefore, the Si+Cr+Mn value is limited to 1.5 to 3.0% in the present invention.

The rail steel having the component composition described above is melted by a melting furnace used ordinarily such as a converter, an electric furnace, etc., and the rail is produced by subjecting this molten steel to ingot making, breakdown method or a continuous casting method, and further to hot rolling. Next, the head portion of the rail holding the high temperature heat of hot rolling or the head portion of the rail heated to a high temperature for the purpose of heat-treatment is acceleratedly cooled, and the lamella space of the pearlite structure of the rail head portion is made fine.

Next, the range in which the pearlite structure is secured is preferably set to the range of the depth of at least 20 mm from the surface of the rail head portion with this rail head portion being the start point, for the following reason. For, if the depth is less than 20 mm, the wear-resistance range of the rail head portion is small and longer service life of the rail cannot be obtained sufficiently. If the range in which the pearlite structure is secured is greater than the range of the depth of 30 mm from the rail head surface with this rail head surface being the start point, desired longer service life of the rail can be obtained sufficiently.

By the way, the term "rail head surface" means the rail head top portion and the rail head side portion or in other words, the portion where the wheel tread surface and the flange of the train come into contact with the rail.

Next, the reason why the pearlite lamella space $\lambda$ ($\lambda$=ferrite thickness $t_1$+cementite thickness $t_2$) and the ratio $R_c$ ($R_c=t_2/t_1$) of the cementite thickness $t_2$ to the ferrite thickness $t_1$ in the pearlite structure are limited as described above will be explained.

First, the reason why the pearlite lamella space is limited to not greater than 100 nm will be explained.

When the lamella space is greater than 100 nm, it becomes difficult to secure the hardness of the pearlite structure, and even when the ratio $R_c$ ($R_c=t_2/t_1$) of the cementite thickness of at least 0.15 is secured, the wear resistance required for the rail on the sharp curve of the heavy load railway having a wheel weight as great as 15 tons cannot be secured. Since surface damage such as creak crack resulting from plastic deformation is induced on the rail head surface, the pearlite lamella space $\lambda$ is limited to not greater than 100 nm.

Next, the reason why the ratio $R_c$ ($R_c=t_2/t_1$) of the cementite thickness $t_2$ to the ferrite thickness $t_1$ in the pearlite structure is limited to at least 0.15 is as follows. If $R_c$ is not greater than 0.15, it becomes difficult to secure the strength of cementite (resistance to separating and sphering) immediately below the rolling surface which secures the wear resistance of the pearlite steel, and to improve the cementite density, and the improvement in the wear resistance cannot be recognized in comparison with the conventional eutectoid rails. Therefore, $R_c$ is limited to at least 0.15.

By the way, the pearlite lamella space $\lambda$, the ferrite thickness $t_1$ and the cementite thickness $t_2$ are measured in the following way. A sample is first etched by a predetermined etching solution such as nital or picral, and in some cases, two-stage replicas are collected from the surface of the etched sample. The sample is inspected in 10 fields by a scanning electron microscope, and $\lambda$, $t_1$ and $t_2$ are measured in each visual field. The measurement values so obtained are then averaged.

Though the metallic structure of the rail is preferably the pearlite structure, a trace amount of proeutectic cementite is sometimes formed in the pearlite structure depending on the cooling method of the rail or on the segregation state of the raw materials. Even when a trace amount of pro-eutectic cementite is formed in the pearlite structure, it does not exert a great influence on the wear resistance, the strength and the toughness of the rail. For this reason, the structure of the pearlitic steel rail according to the present invention may contain a considerable amount of pro-eutectic cementite in mixture.

Next, the hardness at each rail portion in the present invention will be explained.

Figure 6:
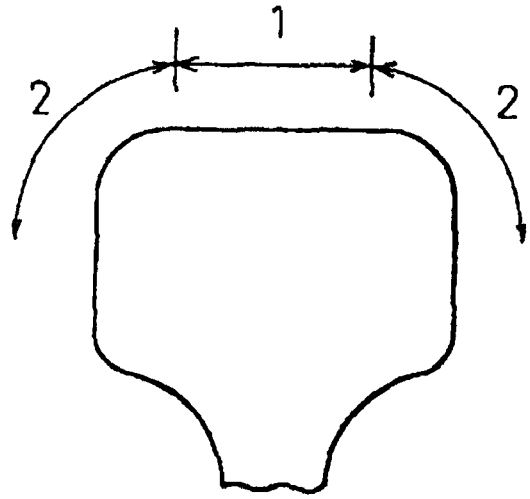
FIG. 6 is a schematic view showing the names of surface positions in the section of a rail head portion.

FIG. 6 shows the names of the surface positions in the section of the head portion of the rail in the present invention. The rail head portion includes a head top portion 1 and head corner portions 2. A part of one of the head corner portions 2 is a gage corner portion (G.C. portion) which mainly comes into contact with the wheel flange.

The preferred range of the hardness of the pearlite structure according to the present invention is at least Hv 320. If the hardness is less than Hv 320, it becomes difficult to secure the wear resistance required for the rail of the heavy load railway by the present component system, and a metallic plastic flow occurs due to strong contact between the rail and the wheel at the rail G.C. (gage corner) portion in the sharply curved zone, so that surface damage such as head check or flaking occurs.

In order to further improve the damage resistance of the gage corner portion described above, the hardness of the rail gage corner portion is preferably at least Hv 360 when the damage of the corner portion is considered in the present invention. If the hardness is less than Hv 360, it is difficult to secure the wear resistance required for the gage corner portion of the rail in the sharply curved zone of the heavy load railway by the component system of the present invention. Further, metallic plastic flow occurs due to the strong contact between the rail and the wheel at the G.C. portion, and surface damage such as head check or flaking thereby occurs.

Improving the strength of the gage corner portion is also effective for preventing the damage due to the internal fatigue that occurs from inside the corner portion, and the higher hardness obtained by a higher carbon content can prevent the formation of the pro-eutetic ferrite as one of the start points of internal fatigue damage. From these two aspects, too, not only the wear but also the internal fatigue damage can be improved and the longer service life can be accomplished.

In this case, the hardness of the rail head top portion is preferably Hv 250 to 320. If the hardness is less than Hv 250, accumulation of the rolling fatigue layer by the reduction of the contact surface pressure and the promotion of the wear can be prevented, but the strength of the top head portion is remarkably insufficient. Therefore, damage resulting from plastic deformation such as head check proceeds remarkably before the rolling fatigue layer is removed by the wear and furthermore, corrugated wear is induced. Therefore, the hardness of the head top portion is limited to at least Hv 250. If the hardness exceeds Hv 320, the reduction of the contact surface pressure of the rail head top portion and the promotion of the wear become insufficient, and the rolling fatigue layer is built up at the head top portion.

Here, when the service life of the rail due to the wear is taken into consideration, the range of the depth of at least 20 mm from the surface of each portion as the start point preferably has a predetermined hardness as to the hardness of the gage corner portion and the head top portion.

Next, the reason why the cooling stop temperature range and the accelerated cooling rate are limited as described above will be explained in detail.

First, accelerated cooling from the austenite zone temperature is limited to the cooling rate of 1° to 10° C./sec and the cooling stop temperature is limited to the range of 700° to 500° C., for the following reasons.

When accelerated cooling is stopped at a temperature higher than 700° C., the pearlite transformation starts occurring immediately after accelerated cooling, and a coarse pearlite structure having a low hardness is formed, so that the hardness of the rail head portion becomes less than Hv 320. Therefore, it is limited to a temperature not higher than 700° C. When accelerated cooling is carried out down to temperature less than 500° C., on the other hand, sufficient recuperation from inside the rail cannot be expected after accelerated cooling, and the martensite structure detrimental to the toughness and the wear resistance of the rail is formed at the segregation portion. Therefore, it is limited to a temperature not lower than 500° C. The technical significance that the cooling stop temperature is at least 500° C. is that the microsegregation portion inside the rail is converted to a sound pearlite structure, and at least 90% of the rail head portion as a whole has completed the pearlite transformation.

When the accelerated cooling rate is less than 1° C./sec, the pearlite transformation starts occurring during accelerated cooling. In consequence, a coarse pearlite structure having a low hardness is formed and the hardness of the rail head portion is less than Hv 320. Further, large quantities of pro-eutectic cementite detrimental to the toughness and the ductility of the rail are formed. Therefore, the accelerated cooling rate is limited to at least 1° C./sec. A cooling rate exceeding 10° C./sec cannot be accomplished by using air which is the most economical and the most stable cooling medium from the aspect of heat-treatment. Therefore, the cooling rate is limited to 10° C./sec.

In order to produce a rail having a pearlite structure having a hardness of at least 320 and a high wear resistance, therefore, accelerated cooling must be carried out at a rate of 1° to 10° C./sec from the austenite zone temperature to the cooling stop temperature of 700° to 500° C., and a pearlite structure having a high hardness is preferably formed in a low temperature zone.

Next, accelerated cooling, when a cooling medium other than water such as mist, atomized water, etc., is used, is set to a cooling rate of more than 10° to 30° C./sec from the austenite temperature zone, and is stopped at the point when the pearlite transformation has proceeded at least 70%, for the following reasons.

Figure 2:
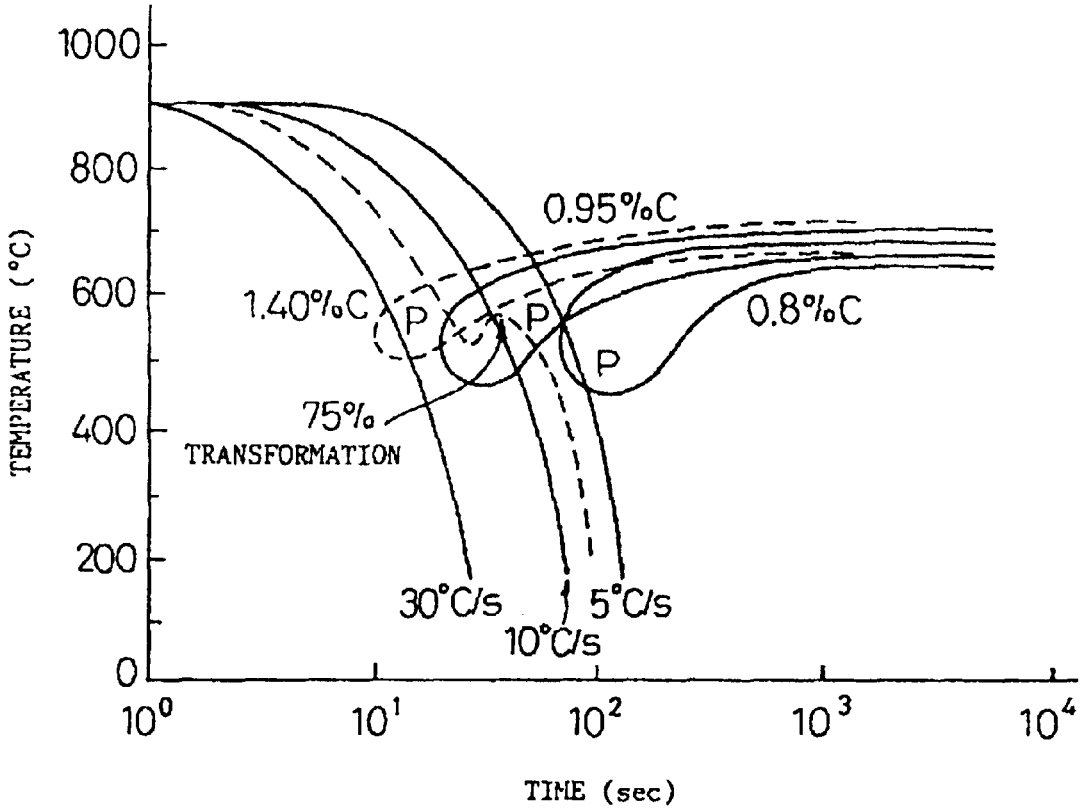
FIG. 2 is a diagram showing continuous cooling transformation of an eutectoid rail steel and of a hypereutectoid rail steel after heating at 1,000° C.

First, it can be appreciated from FIG. 2 that the composition always passes through the pearlite nose at the cooling rate of not higher than 10° C./sec, but only those having a limited C % pass through the nose position below 10° C./sec. In the latter case, supercooling becomes greater with a higher cooling rate, and if cooling is as such continued, large quantities of martensite structure mix into the pearlite structure. If supercooling is great, on the other hand, the pearlite transformation of the rail head portion can be completed as a whole by exothermy of the pearlite transformation even when cooling is stopped at a certain temperature, provided that the pearlite transformation has proceeded to a predetermined extent. The limit pearlite transformation quantity for completing the pearlite transformation is at least 70% on the basis of the detailed experiments, and the example of 0.95% shown in FIG. 2 is conceptually shown in super-position with the CCT diagram. It can be understood from the diagram that when a 75% transformation point is reached, the passage through the pearlite transformation zone can be accomplished by recuperation by stopping accelerated cooling, causing recuperation in the rail itself and bringing the cooling characteristic as close as possible to the cooling curve of not greater than 10° C./sec.

This point will be explained below in further detail.

First, the reason why the cooling rate is limited to more than 10° to 30° C./sec from the austenite zone temperature when water, etc., is used as the cooling medium is as follows. In this case, the productivity of heat-treatment is by far higher than when cooling is carried out at a rate of 1° to 10° C./sec. and as shown in the continuous cooling transformation diagram of FIG. 2, the pearlite nose shifts to the shorter time side in the hyper-eutectoid rail steel than in the eutectoid rail. The nose position corresponds to the rate of more than 10° to 30° C./sec in the component range of the present invention. In continuous cooling, pearlite transformation heat is forcedly restricted, and when cooling is, as such, carried out at a predetermined rate, the martensite structure mixes into the pearlite structure. In the practical heat-treatment of the rails, however, the pearlite transformation is sufficiently promoted by the mass of the rail once the pearlite transformation nose is reached by the volume of the rail head portion. Because the water quantity adjustment at a rate of lower than 10° C./sec cannot stably control cooling when the cooling medium such as water is used, the lower limit is limited to 10° C./sec. When cooling is carried out at a cooling rate exceeding 30° C./sec, the composition does not hit the pearlite zone and the major proportion is converted to the martensite structure. Even when it reaches the pearlite nose, pearlite transformation of more than 70% cannot be expected, and the pearlite transformation remains insufficient and the martensite structure mixes after cooling.

The reason why cooling is stopped at the pearlite transformation of at least 70% is because, if accelerated cooling at a rate of more than 10° to 30° C./sec is continued down to a low temperature, completion of the pearlite transformation of the rail head portion as a whole cannot be accomplished even when exothermy by the pearlite transformation by stopping cooling is taken into consideration. As a result, large quantities of martensite are formed in the rail head portion but the inside the rail head portion in which microscopic segregation exists is cooled while it does not yet undergo transformation, so that island-like martensite structures exist in the spot form and they are detrimental to the rail. Therefore, it is necessary to stop accelerated cooling at the point when at least 70% of pearlite transformation is formed inside the pearlite nose and to sufficiently promote the pearlite transformation by the heat of the rail head portion. Here, the scale for judging at least 70% of the pearlite transformation is as follows. Namely, when the cooling rate is measured by a thermo-couple fitted to the surface of the rail head portion, exothermy of the pearlite transformation occurs, and a point immediately before the point at which the temperature rise due to exothermy by the transformation stops corresponds to about 70% of pearlite transformation quantity.

The range of the accelerated cooling rate is limited to more than 10° to 30° C./sec from the concept of the accelerated cooling rate and the stop timing of accelerated cooling described above, and the stop timing of the accelerated cooling is limited to at least 70% of the pearlite transformation. Incidentally, means for obtaining the cooling rate of more than 10° to 30° C./sec is mist cooling, water-air mixture spray cooling or their combination, or immersion of the rail head portion or the whole into oil, hot water, polymer plus water, salt bath, etc.

After accelerated cooling is stopped, gradual cooling is carried out by leaving the rail standing. The cooling rate at this time is generally not higher than 1° C./sec, and the martensite transformation does not practically occur even at a low temperature.

By the way, the object of improving the weld portion according to the present invention can be sufficiently accomplished by setting the cooling rate of accelerated cooling to 1° to 10° C./sec and stopping accelerated cooling at a temperature of 700° to 500° C. Further, the improvement of the damage resistance of the gage corner portion can be accomplished by satisfying the accelerated cooling condition described above.

Hereinafter, the present invention will be explained in further detail with reference to Examples thereof shown in the accompanying drawings.

EXAMPLES

Example 1

Table 1 tabulates the chemical components of the rail steel having the pearlite structure of this Example 1 of the present invention and the chemical components of a Comparative rail steel. Table 2 tabulates the lamella space λ (λ=ferrite thickness $t_1$+cementite thickness $t_2$), the ratio $R_c$ ($R_c=t_2/t_1$) and the result of measurement of the wear quantity after repetition of 500,000 times under a dry condition by a Nishihara type wear test of each of these steels.

Figure 3:
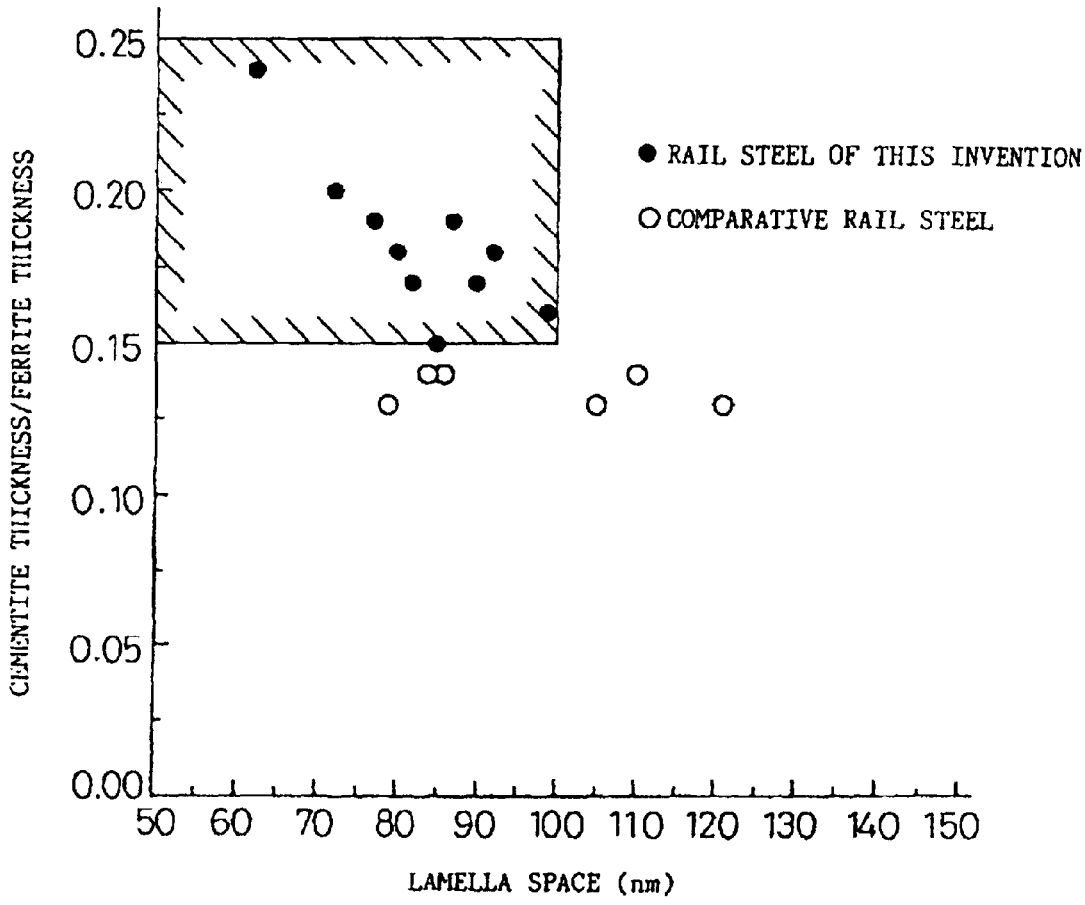
FIG. 3 is a diagram showing the relation between a lamella space and a cementite thickness/ferrite thickness between a comparative rail steel and a rail steel according to the present invention.
Figure 4:
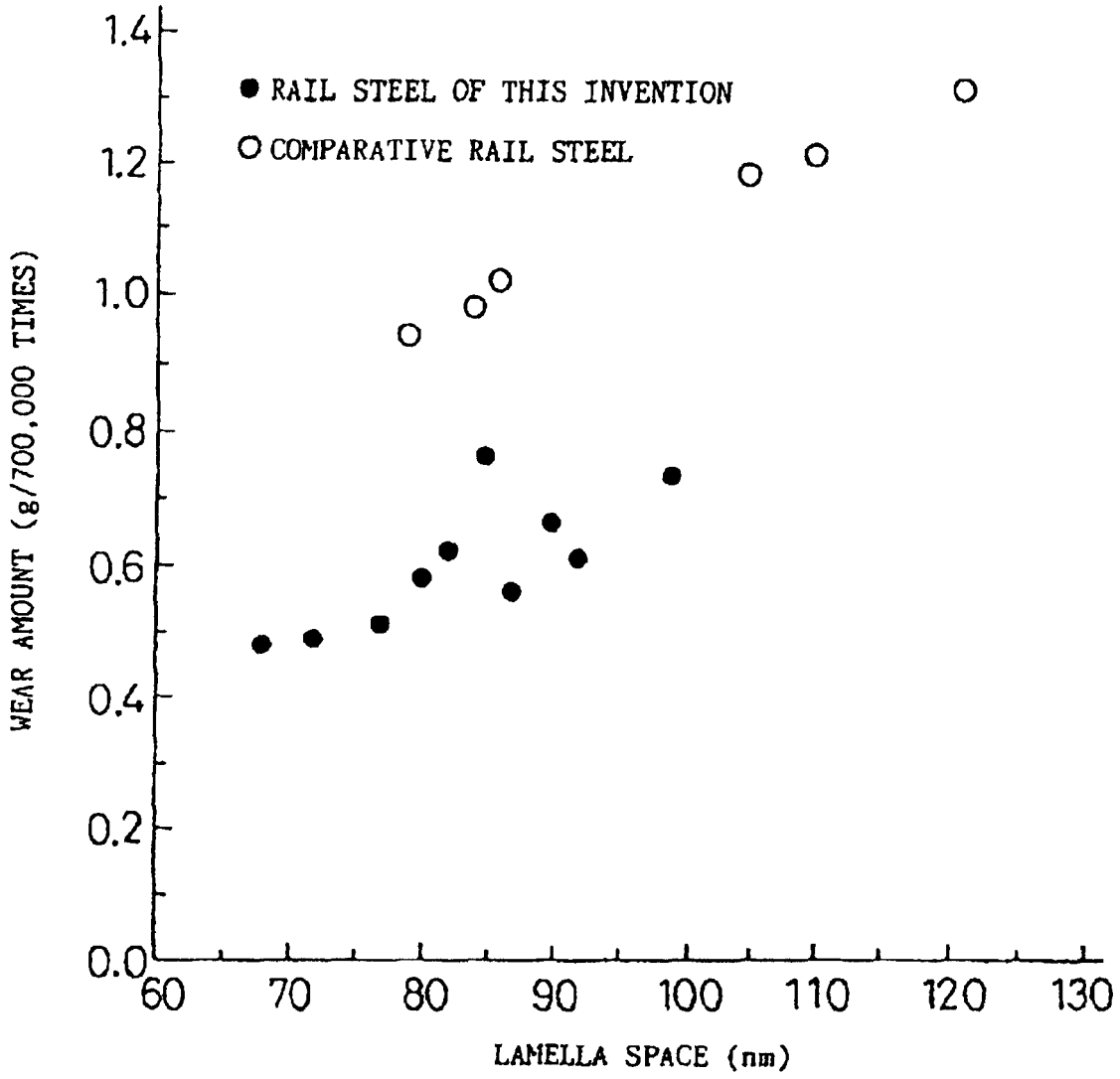
FIG. 4 is a diagram showing the relation between the lamella space and a wear amount as the wear test result of a comparative rail steel and of a rail steel according to the present invention.
Figure 5:
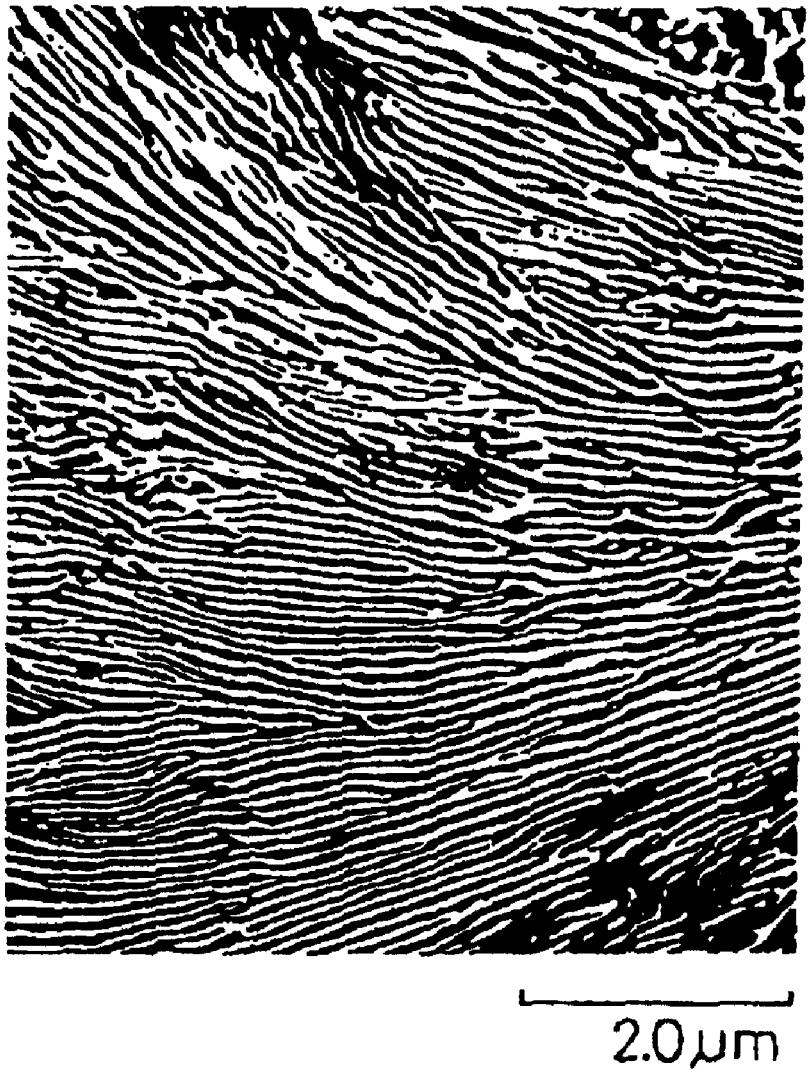
FIG. 5 is a photograph showing an example of the space between the cementite/ferrite layers in the rail steel according to the present invention.

Further, FIGS. 3 and 4 show the relation between the lamella space (λ) and the ratio of the cementite thickness to the ferrite thickness and the relation between the lamella space (λ) and the wear quantity of the Comparative rail steel and the present rail steel. FIG. 5 shows a 10,000× micrograph of the present rail steel (No. 8). FIG. 5 is obtained by etching the present rail steel by a 5% nital solution and observing it through a scanning electron micrograph. A white portion in the drawing represents the cementite layer and a black portion represents the ferrite layer.

Incidentally, the construction of the rails is as follows. Rails of this invention (10 steels, Nos. 1 to 10)

Heat-treated rails applied with accelerated cooling at the head portion thereof and having the components within the range described above, a pearlite lamella space λ (λ=ferrite thickness $t_1$+cementite thickness $t_2$) of not more than 100 nm and a ratio $R_c$ ($R_c=t_2/t_1$) of the cementite thickness $t_2$ to the ferrite thickness $t_1$ of at least 0.15 in the pearlite structure.

Comparative rails (6 rails, Nos. 11 to 16)

Comparative rails by eutectoid carbon-containing rails

Figure 7:
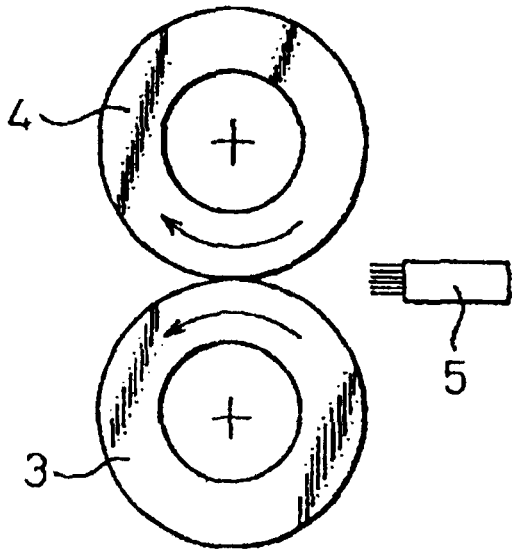
FIG. 7 is a schematic view showing a Nishihara wear tester.

The wear testing condition is as follows. FIG. 7 shows the Nishihara type wear testing machine. In this drawing, reference numeral 3 denotes a rail testpiece, 4 denotes a mating material and 5 denotes a cooling nozzle.

Testing machine: Nishihara type wear tester

Shape of testpiece: disc-like testpiece (outer diameter=30 mm, thickness=8 mm)

Test load: 686N

Slippage ratio: 9%

Wheel material: tempered martensite steel (Hv 350)

Atmosphere: in air

Compulsive cooling by compressed air (flow rate: 100 Nl/min)

Number of times of repetition: 700,000 times

TABLE 1

| | | chemical composition (wt %) | | | | | | | |
|---|---|---|---|---|---|---|---|---|---|
| rail | No. | C | Si | Mn | Cr | Mo | V | Nb | Co |
| Present steel | 1 | 0.96 | 0.52 | 1.20 | — | 0.19 | — | — | — |
| | 2 | 0.96 | 0.61 | 1.21 | — | — | — | — | 1.20 |
| | 3 | 0.90 | 0.25 | 1.12 | — | — | — | — | — |
| | 4 | 0.91 | 0.25 | 0.81 | 0.45 | — | — | — | — |
| | 5 | 0.94 | 0.25 | 0.85 | — | — | — | — | — |
| | 6 | 0.95 | 0.21 | 0.61 | 0.30 | — | — | — | — |
| | 7 | 0.97 | 0.25 | 0.75 | — | — | — | — | — |
| | 8 | 0.99 | 0.17 | 0.49 | 0.23 | — | — | — | — |
| | 9 | 1.05 | 0.20 | 0.59 | — | — | — | 0.05 | — |
| | 10 | 1.19 | 0.10 | 0.40 | — | — | 0.17 | — | — |
| Comparative rail steel | 11 | 0.78 | 0.24 | 1.33 | — | — | — | — | — |
| | 12 | 0.79 | 0.50 | 1.24 | — | — | — | — | — |
| | 13 | 0.78 | 0.81 | 1.11 | — | — | — | — | — |
| | 14 | 0.79 | 0.24 | 1.10 | 0.21 | — | — | — | — |
| | 15 | 0.79 | 0.50 | 1.03 | 0.24 | — | — | — | — |
| | 16 | 0.78 | 0.81 | 0.91 | 0.58 | — | — | — | — |

TABLE 2

| rail | No. | lamella space λ(nm) | $R_c = t_2/t_1$* | wear amount (g/500,000 times) |
|---|---|---|---|---|
| Present rail steel | 1 | 85 | 0.15 | 0.76 |
| | 2 | 99 | 0.16 | 0.73 |
| | 3 | 90 | 0.17 | 0.66 |
| | 4 | 82 | 0.17 | 0.62 |
| | 5 | 92 | 0.18 | 0.61 |
| | 6 | 80 | 0.18 | 0.58 |
| | 7 | 87 | 0.19 | 0.56 |
| | 8 | 77 | 0.19 | 0.51 |
| | 9 | 72 | 0.20 | 0.49 |
| | 10 | 68 | 0.24 | 0.48 |
| Comparative rail steel | 11 | 121 | 0.13 | 1.31 |
| | 12 | 110 | 0.14 | 1.21 |
| | 13 | 105 | 0.13 | 1.18 |
| | 14 | 86 | 0.14 | 1.02 |
| | 15 | 84 | 0.14 | 0.98 |
| | 16 | 79 | 0.13 | 0.94 |

*ratio $R_c$ = cementite thickness $t_2$:ferrite thickness $t_1$

As can be seen from Tables 1 and 2, the present rail steels make fine the lamella space [(γ)] (λ) and at the same time, increase the ratio $R_c$ ($R_c = t_2/t_1$) of the cementite thickness $t_2$ to the ferrite thickness $t_1$ much more than the Comparative rail steels. Therefore, the present steels have a smaller wear amount at the same lamella space than the Comparative rail steels and have drastically improved wear resistance.

Example 2

Table 3 shows the chemical components of the Present rail steels and the accelerated cooling condition, and Table 4 shows the chemical components of the Comparative rail steels and the accelerated cooling condition. Further, Tables 3 and 4 represent also the hardness after accelerated cooling and the measurement result of the wear amount after repetition of 700,000 times under the compulsive cooling condition by compressed air in the Nishihara type wear test shown in FIG. 7.

Figure 8:
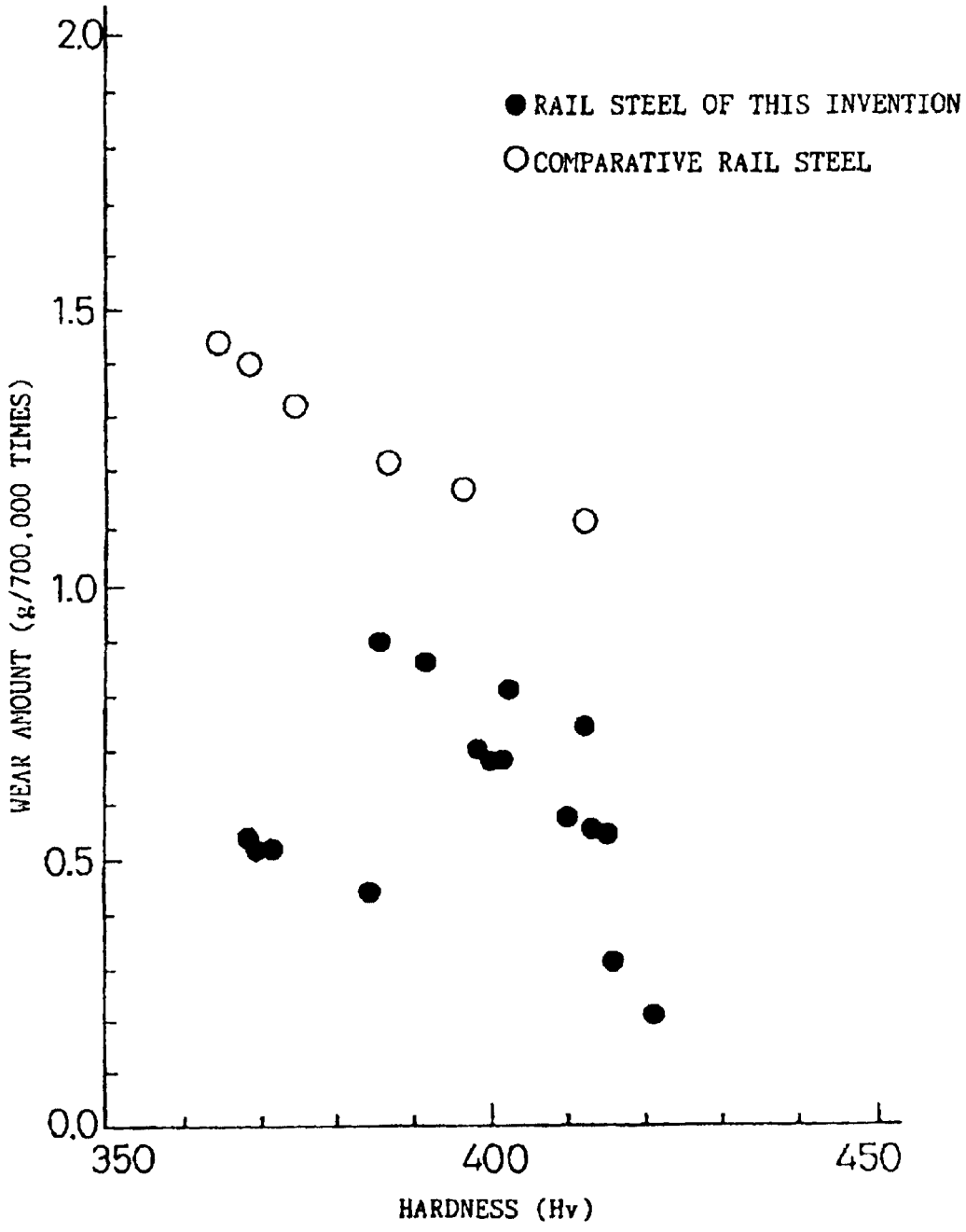
FIG. 8 is a diagram showing the relation between the hardness and the wear amount as the wear test results of the rail steel according to the present invention and of the comparative rail steel.

FIG. 8 graphically compares the wear test results between the Present rail steels and the Comparative rail steels shown in Tables 1 and 4 in terms of the relation between the hardness and the wear amount.

By the way, the rail construction is as follows.

Present rails (16 rails) Nos. 17 to 32

Heat-treated rails having the components within the range described above, and exhibiting the pearlite structure within the range of depth of at least 20 mm from the surfaces of the gage corner portion and the head top portion of the steel rails as the start point, and applied with accelerated cooling at the head portion having the hardness of at least Hv 320 in the pearlite structure within the range described above.

TABLE 3

| | | chemical composition (wt %) | | | | | | | | | accelerated cooling rate of head portion | hardness of head portion | wear amount of rail head portion testpiece |
|---|---|---|---|---|---|---|---|---|---|---|---|---|---|
| rail | No. | C | Si | Mn | Cr | Mo | V | Nb | Co | B | (° C./sec) | (Hv) | (g/700,000 times) |
| rail of this invention | 17 | 0.86 | 0.49 | 1.48 | — | 0.02 | — | — | — | — | 4 | 385 | 0.90 |
| | 18 | 0.88 | 0.65 | 1.05 | — | — | — | — | 0.05 | — | 10 | 391 | 0.86 |
| | 19 | 0.90 | 0.49 | 1.02 | 0.21 | — | — | — | — | — | 3 | 402 | 0.81 |
| | 20 | 0.91 | 0.98 | 0.81 | 0.59 | — | — | — | — | — | 1 | 412 | 0.74 |
| | 21 | 0.94 | 0.25 | 0.85 | — | — | 0.09 | — | — | — | 5 | 401 | 0.68 |
| | 22 | 0.95 | 0.24 | 0.83 | — | — | 0.10 | — | — | — | 5 | 400<br>319* | 0.68 |
| | 23 | 0.94 | 0.26 | 0.86 | — | — | 0.08 | — | — | — | 5 | 398<br>275* | 0.70 |
| | 24 | 0.95 | 0.21 | 0.61 | 0.30 | — | — | — | — | — | 4 | 415 | 0.54 |
| | 25 | 0.94 | 0.22 | 0.63 | 0.29 | — | — | — | — | — | 4 | 413<br>317* | 0.55 |
| | 26 | 0.94 | 0.23 | 0.61 | 0.29 | — | — | — | — | — | 4 | 410<br>278* | 0.57 |
| | 27 | 0.97 | 0.46 | 0.75 | — | — | — | — | — | — | 2 | 371 | 0.52 |
| | 28 | 0.98 | 0.43 | 0.73 | — | — | — | — | — | — | 2 | 369<br>316* | 0.52 |
| | 29 | 0.97 | 0.45 | 0.75 | — | — | — | — | — | — | 2 | 368<br>276* | 0.54 |
| | 30 | 0.94 | 0.17 | 0.49 | 0.23 | — | — | — | — | — | 3 | 384 | 0.44 |
| | 31 | 1.04 | 0.22 | 0.60 | — | — | — | 0.05 | — | — | 3 | 416 | 0.31 |
| | 32 | 1.19 | 0.10 | 0.41 | — | — | — | — | — | 0.0010 | 2 | 421 | 0.21 |

*hardness at a point of 1 mm below a sole surface when a sole was cooled under control.

TABLE 4

| rail | No. | chemical composition (wt %) C | Si | Mn | Cr | Mo | V | Nb | Co | B | accelerated cooling rate of head portion (° C./sec) | hardness of head portion (Hv) | wear amount of rail head portion testpiece (g/700,000 times) |
|---|---|---|---|---|---|---|---|---|---|---|---|---|---|
| Comparative rail steel | 33 | 0.77 | 0.22 | 1.36 | — | — | — | — | — | — | 4 | 364 | 1.44 |
| | 34 | 0.78 | 0.54 | 1.30 | — | — | — | — | — | — | 3 | 368 | 1.40 |
| | 35 | 0.82 | 0.78 | 1.05 | — | — | — | — | — | — | 3 | 374 | 1.32 |
| | 36 | 0.81 | 0.21 | 1.21 | 0.19 | — | — | — | — | — | 3 | 386 | 1.22 |
| | 37 | 0.82 | 0.49 | 1.10 | 0.22 | — | — | — | — | — | 3 | 396 | 1.17 |
| | 38 | 0.81 | 0.85 | 0.81 | 0.51 | — | — | — | — | — | 4 | 412 | 1.11 |

As shown in FIG. 8, the Present rail steels increase the carbon content in comparison with the Comparative rail steels and at the same time, improve the hardness. In this way, the present rail steels have a smaller wear amount at the same hardness but have drastically improved wear resistance.

Example 3

Table 5 tabulates the chemical components, the accelerated cooling rate at the time of heat-treatment of the rails and the pearlite structure fractions at the stop of accelerated cooling of each of the present rail steels and Comparative rail steels. Further, Table 6 tabulates the hardness (Hv) of the head surface after heat-treatment of the rails and the wear amount after the Nishihara type wear test of each of the present rail steels and the Comparative rail steels. The wear test results of the rail head materials by the Nishihara type wear tester shown in FIG. 7 are shown.

By the way, the wear testing condition are as follows.

Testing machine: Nishihara type wear tester

Shape of testpiece: disc-like testpiece (outer diameter: 30 mm, thickness: 8 mm)

Test load: 686N

Slippage ratio: 20%

Wheel material: pearlite steel (Hv 390)

Atmosphere: in air (compulsive cooling by compressed air)

Number of times of repetition: 700,000 times

TABLE 5

| rail | No. | chemical composition (wt %) C | Si | Mn | Cr | Mo | V | Nb | head portion accelerated cooling rate (° C./sec) | pearlite proportion at stop of cooling (%) |
|---|---|---|---|---|---|---|---|---|---|---|
| Present rail steel | 39 | 0.86 | 0.86 | 1.20 | | | | | 28 | 75 |
| | 40 | 0.90 | 0.63 | 1.00 | | | | | 25 | 80 |
| | 41 | 1.02 | 0.45 | 0.81 | | | | | 20 | 85 |
| | 42 | 1.20 | 0.31 | 0.62 | | | | | 15 | 90 |
| | 43 | 1.39 | 0.21 | 0.24 | | | | | 12 | 95 |
| | 44 | 0.87 | 0.23 | 0.45 | 0.55 | | | | 25 | 75 |
| | 45 | 0.91 | 0.23 | 0.40 | 0.25 | 0.21 | | | 20 | 75 |
| | 46 | 0.89 | 0.41 | 0.51 | | | 0.12 | | 30 | 80 |
| | 47 | 0.92 | 0.56 | 0.65 | | | 0.08 | 0.015 | 30 | 80 |
| Comparative rail steel | 48 | 0.76 | 0.23 | 0.89 | | | | | 25 | 95 |
| | 49 | 0.79 | 0.41 | 0.87 | 0.25 | | | | 28 | 90 |
| | 50 | 0.76 | 0.82 | 0.88 | 0.55 | | | | 15 | 85 |
| | 51 | 1.50 | 0.23 | 0.85 | | | | | 12 | *— |
| | 52 | 0.90 | 1.23 | 0.85 | | | | | 12 | *65 |
| | 53 | 0.87 | 0.23 | 1.82 | | | | | 12 | *70 |

*Martensite structure and bainite structure solved into the rail head portion after cooling.

TABLE 6

| rail | No. | hardness of head portion (Hv) | wear amount (g/700,000 times) |
|---|---|---|---|
| Present rail steel | 39 | 403 | 0.95 |
| | 40 | 395 | 0.92 |
| | 41 | 418 | 0.63 |
| | 42 | 431 | 0.25 |
| | 43 | 438 | 0.21 |
| | 44 | 396 | 0.98 |
| | 45 | 403 | 0.74 |
| | 46 | 392 | 0.75 |
| | 47 | 397 | 0.77 |
| Comparative rail steel | 48 | 385 | 1.36 |
| | 49 | 391 | 1.25 |
| | 50 | 393 | 1.23 |
| | 51 | 580 | 1.56 |
| | 52 | 371 | 1.35 |
| | 53 | 395 | 1.31 |

In comparison with the eutectoid pearlite steels according to the prior art, the hypereutectoid pearlite rails according to the present invention have a higher wear resistance at the same hardness, drastically improve the wear resistance of the outer track rail of the curved zone, have a high internal fatigue damage resistance because the formation of the pro-eutectic ferrite as the start point of the internal fatigue cracks formed inside the gage corner portion of the outer track rail laid down in the sharp curve zone does not exist, and drastically improve the rail heat-treatment properties by the combination of quick accelerated cooling and the stop of cooling.

Example 4

Figure 9:
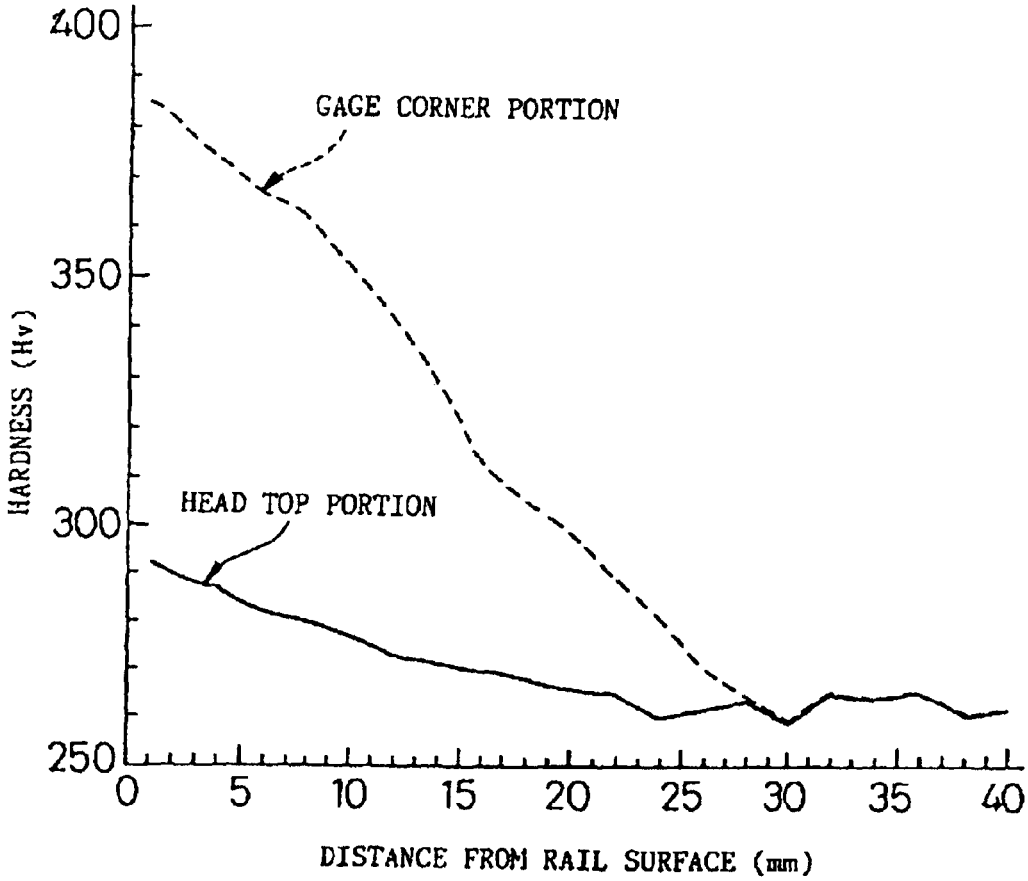
FIG. 9 is a diagram showing an example of the hardness distribution of the section of the rail head portion according to an embodiment of the present invention.
Figure 10:
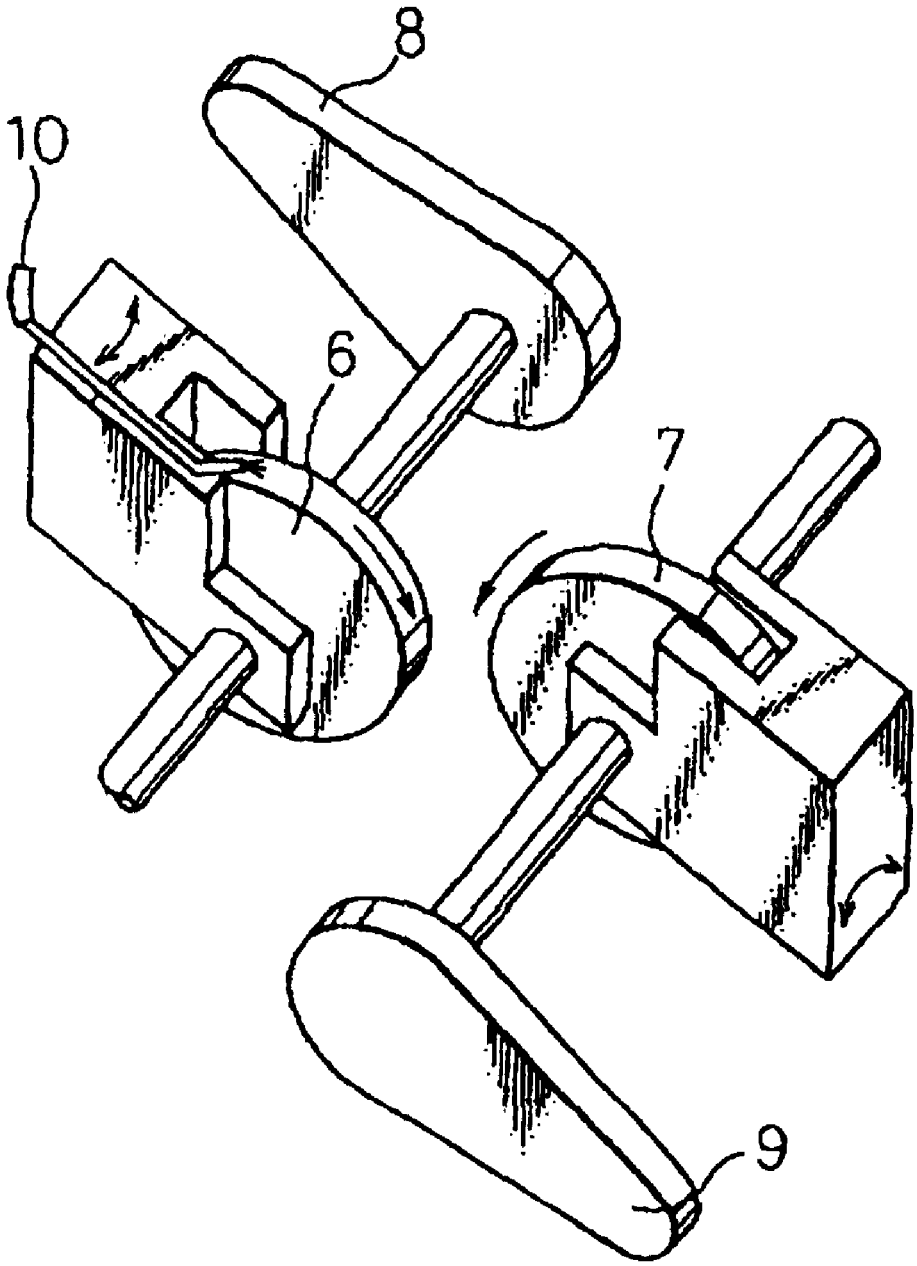
FIG. 10 is a schematic view showing the outline of a rolling fatigue tester.
Figure 11:
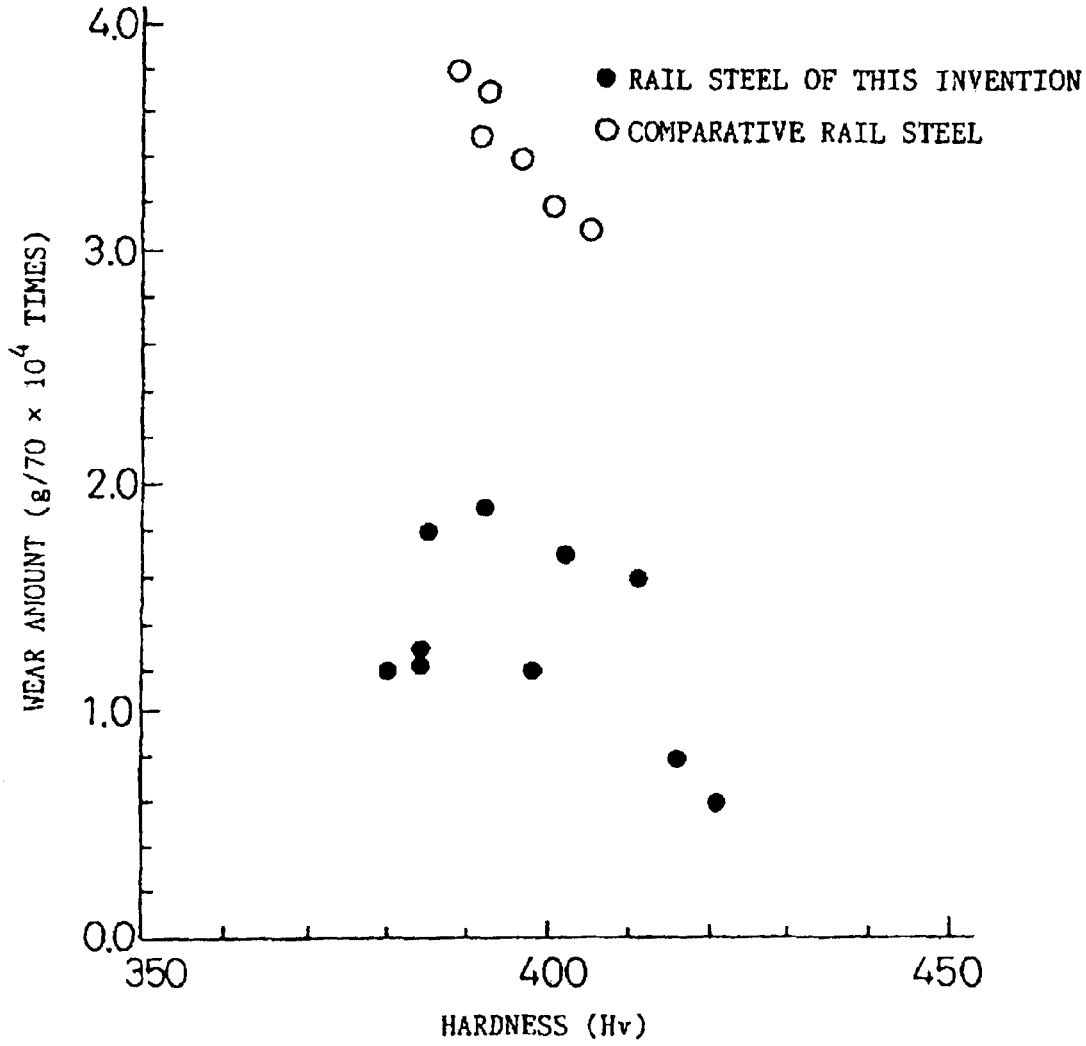
FIG. 11 is a diagram showing the relation between the hardness of the gage corner portion and the wear amount in the rolling fatigue test.

Table 7 tabulates the chemical components of each of the present rail steels and the Comparative rail steels. Table 8 tabulates the accelerated cooling rate of the rail gage corner portions, and the hardness of the gage corner portion and the head top portion. FIG. 9 shows an example of the hardness distribution of the section of the head portion of the present rail (No. 46).

shape shown in FIG. 10 and the existence of the occurrence of the surface damage at the head top portion. FIG. 11 comparatively shows the maximum wear quantity of the gage corner portions of the present rail steels and the Comparative rail steels.

By the way, the construction of the rails is as follows.

Present rails (10 rails) Nos. 54 to 63

Heat-treated rails having a hardness of not less than Hv 360 at the gage corner portion and a hardness of Hv 250 to 320 at the head top portion, having the components within the range described above, and applied with accelerated cooling at the gage corner portion thereof.

Comparative rails (6 rails) Nos. 64 to 69

Comparative rails by eutectoid carbon-containing steel.

The condition of the rolling fatigue test is as follows.

Testing machine: rolling fatigue tester (see FIG. 10)

Shape of testpiece: disc-like testpiece (outer diameter= 200 mm, sectional shape of rail material, ¼ model of 136 pound-rail)

TABLE 7

| | | chemical composition (wt %) | | | | | | | | |
|---|---|---|---|---|---|---|---|---|---|---|
| rail | No. | C | Si | Mn | Cr | Mo | V | Nb | Co | B |
| Present rail steel | 54 | 0.87 | 0.51 | 1.49 | — | 0.01 | — | — | — | — |
| | 55 | 0.88 | 0.67 | 1.01 | — | — | — | — | 0.40 | — |
| | 56 | 0.90 | 0.55 | 0.98 | 0.21 | — | 0.07 | — | — | — |
| | 57 | 0.91 | 0.99 | 0.78 | 0.58 | — | — | — | — | — |
| | 58 | 0.94 | 0.26 | 0.88 | — | — | — | — | — | 0.0010 |
| | 59 | 0.95 | 0.22 | 0.71 | 0.25 | — | — | — | — | — |
| | 60 | 0.97 | 0.49 | 0.78 | — | — | — | — | — | — |
| | 61 | 0.98 | 0.19 | 0.51 | 0.23 | — | — | — | — | — |
| | 62 | 1.05 | 0.30 | 0.71 | — | — | — | 0.05 | — | — |
| | 63 | 1.19 | 0.10 | 0.41 | — | — | 0.09 | — | — | — |
| Comparative rail steel | 64 | 0.77 | 0.51 | 1.36 | — | — | — | — | — | — |
| | 65 | 0.78 | 0.54 | 1.30 | — | — | — | — | — | — |
| | 66 | 0.82 | 0.25 | 1.05 | 0.25 | — | — | — | — | — |
| | 67 | 0.81 | 0.28 | 1.08 | 0.21 | — | — | — | — | — |
| | 68 | 0.82 | 0.49 | 1.10 | 0.22 | — | — | — | — | — |
| | 69 | 0.82 | 0.51 | 1.12 | 0.24 | — | — | — | — | — |

TABLE 8

| rail | No. | accelerated cooling rate of gage corner portion (° C./sec) | hardness of gage corner portion (HV) | hardness of head to portion (HV) | maximum wear amount of gage corner portion (mm) | existence of the occurrence of the surface damage at the head top portion (1,000,000 times) |
|---|---|---|---|---|---|---|
| Present rail steel | 54 | 3 | 385 | 288 | 1.8 | no damage occurrence |
| | 55 | 10 | 392 | 275 | 1.9 | " |
| | 56 | 3 | 402 | 306 | 1.7 | " |
| | 57 | 1 | 411 | 300 | 1.6 | " |
| | 58 | 5 | 384 | 285 | 1.3 | " |
| | 59 | 3 | 398 | 294 | 1.2 | " |
| | 60 | 2 | 380 | 271 | 1.2 | " |
| | 61 | 3 | 384 | 292 | 1.2 | " |
| | 62 | 3 | 416 | 304 | 0.8 | " |
| | 63 | 2 | 421 | 315 | 0.6 | " |
| Comparative rail steel | 64 | 4* | 392 | 388 | 3.7 | damage occurred |
| | 65 | 4 | 388 | 305 | 3.8 | no damage occurrence |
| | 66 | 3* | 396 | 390 | 3.4 | damage occurred |
| | 67 | 3 | 391 | 319 | 3.5 | no damage occurrence |
| | 68 | 3* | 405 | 399 | 3.1 | damage occurred |
| | 69 | 3 | 400 | 315 | 3.2 | no damage occurrence |

*Accelerated cooling was applied to the head top portion at the same cooling rate as the gage corner portion.

Further, Table 8 also represents the maximum wear amount of the gage corner portion of the rail testpiece by a water lubrication rolling fatigue tester using disc testpieces 6 and 7 reduced to ¼ the exact size of the rail and the wheel Test load:

radial load: 2.0 tons thrust load: 0.5 tons

Angle of torsion: 0.5° (reproduction of sharp curve)

Atmosphere: dry+water lubrication (60 cc/min)

Number of revolution: dry: 100 rpm, water lubrication: 300 rpm)

Number of times of repetition:

Dry state to 5,000 times, and thereafter test was conducted to 700,000 times with water lubrication.

As tabulated in Table 7, the present rail steels increase the carbon content in comparison with the Comparative rail steels and at the same time, provide the difference of the hardness in the hardness distribution of the section by the heat-treatment so that the hardness of the gage corner portion is higher than that of the head top portion as shown in FIG. 9. Accordingly, the maximum wear amount of the gage corner portion is smaller than that of the Comparative rails, and the surface damage resistance at the head top portion is equal to the Comparative rails in which the hardness of the gage corner portion is higher than that of the head top portion.

Example 5

This Example relates to the improvement of the weld joint portion. Table 9 tabulates the principal chemical components of the present rail steel of this Example and a Comparative rail steel.

TABLE 9

| | principal chemical composition (wt %) | | | | Si + Cr + Mn |
|---|---|---|---|---|---|
| | C | Si | Mn | Cr | (wt %) |
| present rail steel | 0.90 | 0.88 | 0.60 | 0.58 | 2.06 |
| Comparative rail steel | 0.91 | 0.46 | 0.58 | 0.21 | 1.25 |

Incidentally, the construction of each rail is as follows.

Present rail steel

Heat-treated rail having the components listed above, and a pearlite lamella space of not greater than 100 nm. Accelerated cooling was applied to the head portion having a ratio of the cementite thickness to the ferrite thickness of at least 0.15 in the pearlite structure.

Comparative rail steel

A Comparative steel by an eutectoid carbon-containing steel.

The flash butt welding condition is as follows.

Welding machine: Model K-355

Capacity: 150 KVA

Secondary current: 20,000 amp, maximum

Clamp force: 125 t, maximum

Upset amount: 10 mm

Figure 12:
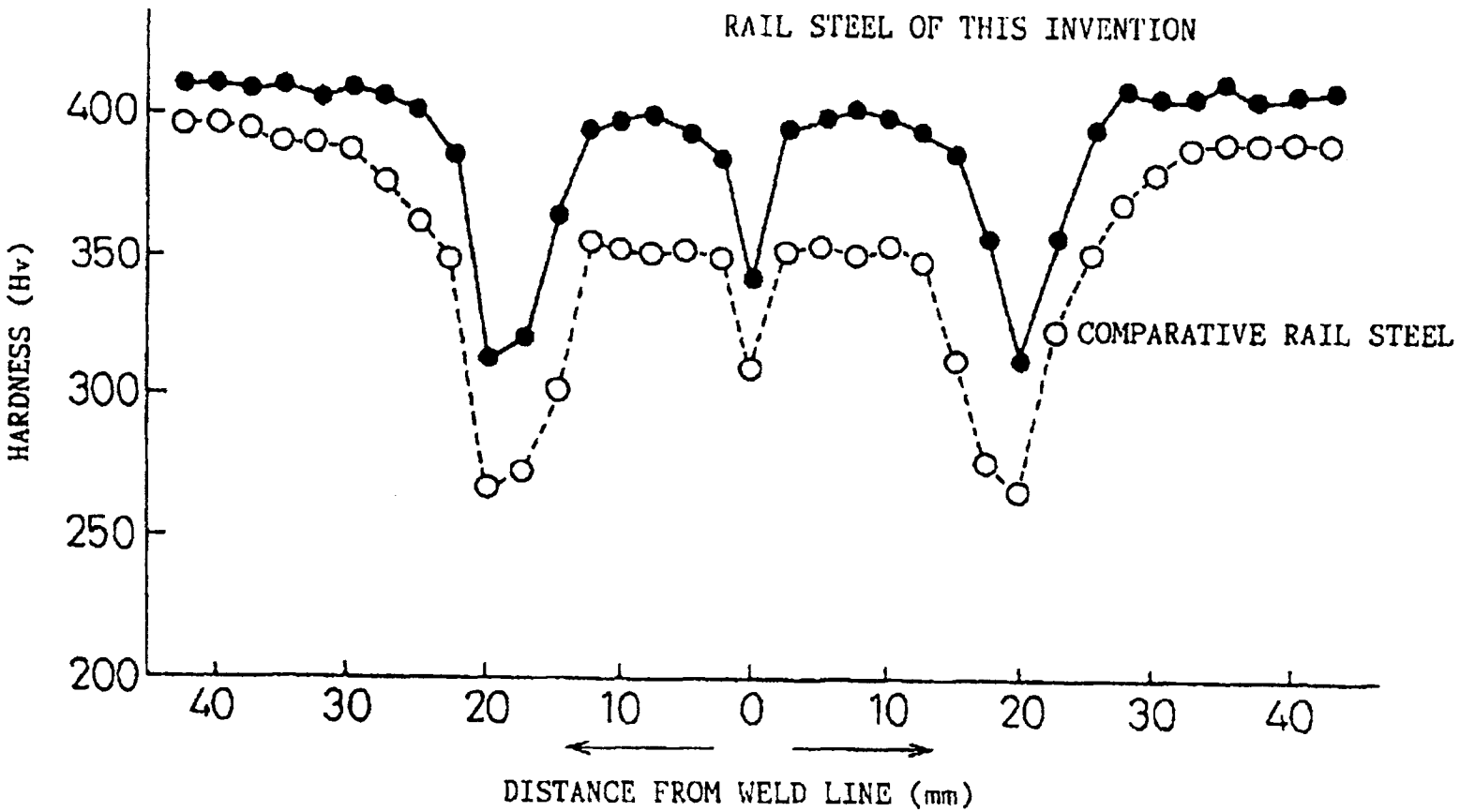
FIG. 12 is a diagram showing the relation between the position in the proximity of a weld portion and hardness distribution of the rail steel according to the present invention and of a comparative rail steel.

FIG. 12 shows the hardness values of the steels of this Example after welding by the relation between the hardness and the distance from a weld line. It can be appreciated from this diagram that in the rail steel according to the present invention, the drop of the hardness on the weld line due to decarburization can be improved, and the drop of the hardness due to sphering of the heat affected portion tends to decrease. Further, the difference of the hardness from the hardness of the base metal is not greater than 30 in terms of Hv at weld portions other than at the position where an extreme drop of the hardness occurs.

INDUSTRIAL APPLICABILITY

The rail steels according to the present invention increase the carbon content to a higher content than the conventional rail steels, narrow the lamella space in the pearlite structure, further restrict the cementite thickness to the ferrite thickness so as to improve breakage resistance due to machining of the pearlite, and obtain the high wear resistance and the high damage resistance by reducing the hardness of the weld portion. Further, the present invention makes it possible to shorten the heat-treatment process and to improve producibility.

We claim:

[1. A pearlitic steel rail, having a good wear resistance, comprising more than 0.85 to 1.20%, in terms of percent by weight, of carbon, characterized in that the structure of said steel rail is a pearlite, a pearlite lamella space of said pearlite is not more than 100 nm, and a ratio of a cementite thickness to a ferrite thickness in said pearlite is at least 0.15.]

[2. A pearlite steel rail, having a good wear resistance, comprising more than 0.85 to 1.20%, in terms of percent by weight, of carbon, characterized in that the structure within the range of a depth of 20 mm from the surface of a rail head portion of said steel rail with said head surface being the start point is pearlite, a pearlite lamella space of said pearlite is not more than 100 nm, and a ratio of a cementite thickness to a ferrite thickness in said pearlite is at least 0.15.]

[3. A pearlite type steel rail, having a good wear resistance, comprising, in terms of percent by weight:

C: more than 0.85 to 1.20%

Si: 0.10 to 1.00%,

Mn: 0.40 to 1.50%, and the balance consisting of iron and unavoidable impurities, said steel rail characterized in that the structure of said steel rail is pearlite, a pearlite lamella space of said pearlite is not more than 100 nm, and a ratio of a cementite thickness to a ferrite thickness in said pearlite is at least 0.15.]

[4. A pearlitic steel rail having a good wear resistance, comprising, in terms of percent by weight:

C: more than 0.85 to 1.20%,

Si: 0.10 to 1.00%,

Mn: 0.04 to 1.50%, and the balance consisting of iron and unavoidable impurities, said steel rail characterized in that the structure within the range of a depth of 20 mm from the surface of a rail head portion of said steel rail with said head surface being the start point is pearlite, a pearlite lamella space of said pearlite is not more than 100 nm, and a ratio of a cementite thickness to a ferrite thickness in said pearlite is at least 0.15.]

[5. A pearlitic steel rail having a good wear resistance, comprising, in terms of percent by weight:

C: more than 0.85 to 1.20%,

Si: 0.10 to 1.00%,

Mn: 0.40 to 1.50, at least one member selected from the group consisting of:

Cr: 0.05 to 0.50%,

Mo: 0.01 to 0.20%,

V: 0.02 to 0.30%,

Nb: 0.002 to 0.05%,

Co: 0.10 to 2.00%,

B: 0.0005 to 0.005%, and the balance consisting of iron and unavoidable impurities, said steel rail characterized in that the structure of said steel rail is pearlite, a pearlite lamella space in said pearlite is not more than 100 nm, and a ratio of a cementite thickness to a ferrite thickness in said pearlite structure is at least 0.15.]

[6. A pearlitic steel rail having a good wear resistance, comprising, in terms of percent by weight:

C: more than 0.85 to 1.20%,

Si: 0.10 to 1.00%,

Mn: 0.40 to 1.50%, at least one member selected from the group consisting of:

Cr: 0.05 to 0.50%,

Mo: 0.01 to 0.20%,

V: 0.02 to 0.30%,

Nb: 0.002 to 0.05%,

Co: 0.10 to 2.00%,

B: 0.0005 to 0.005%, and the balance consisting of iron and unavoidable impurities, said steel rail characterized in that the structure within the range of a depth of 20 mm from the surface of a rail head portion of said steel rail with said head surface being the start point is pearlite, a pearlite lamella space of said pearlite is not more than 100 nm, and a ratio of a cementite thickness to a ferrite thickness in said pearlite is at least 0.15.]

[7. A pearlitic steel rail having a good weldability and a high wear resistance according to claim 1, wherein the difference of hardness between a weld joint portion and a base metal is not more than Hv 30.]

[8. A pearlite type steel rail having a good weldability and a good wear resistance according to claim 3, wherein said chemical components Si, Cr and Mn satisfy the relation Si+Cr+Mn=1.5 to 3.0% in terms of percent by weight.]

[9. A method for producing a pearlitic steel rail as defined in any of claims 1 to 6, said method comprising the steps of:

hot rolling a melted and cast steel to provide a steel rail, with said steel rail retaining rolling heat immediately after hot rolling;

cooling in an accelerated manner said steel rail retaining rolling heat immediately after hot rolling or cooling in an accelerated manner said steel rail heated for heat treatment, said accelerated cooling taking place from an austenite temperature at a cooling rate of 1° to 10° C./sec;

stopping said accelerated cooling at the point when said steel rail temperature reaches 700° to 500° C.; and thereafter leaving said steel rail to cool;

wherein the hardness of said steel rail within the range of a depth of 20 mm from the surface of a head portion of said steel rail is at least Hv 320.]

[10. A method for producing a pearlitic steel rail as defined in any of claims 1 to 6, said method comprising the steps of:

hot rolling a melted and cast steel to provide a steel rail, with said steel rail retaining rolling heat immediately after hot rolling;

cooling is an accelerated manner said steel rail retaining rolling heat immediately after hot rolling or cooling in an accelerated manner said steel rail heated for heat treatment, said accelerated cooling taking place from an austenite temperature at a cooling rate of more than 10° C./sec and up to 30° C./sec;

stopping said accelerated cooling at the point when pearlite transformation of said steel rail has proceeded at least 70%; and thereafter leaving said steel rail to cool;

wherein the hardness of said steel rail within the range of a depth of 20 mm from the surface of a head portion of said steel rail is at least Hv 320.]

[11. A method for producing a pearlitic steel rail as defined in any of claims 1 to 6, said method comprising the steps of:

hot rolling a melted and cast steel to provide a steel rail, with said steel rail retaining rolling heat immediately after hot rolling;

cooling in an accelerated manner said steel rail retaining rolling heat immediately after hot rolling or cooling in an accelerated manner said steel rail heated for heat treatment, said accelerated cooling taking place from an austenite temperature at a cooling rate of 1° to 10° C./sec;

stopping said accelerated cooling at the point when the temperature of a gage corner portion of said steel rail reaches 700° to 500° C.; and thereafter leaving said steel rail to cool;

wherein the hardness of said gage corner portion of said steel rail is at least Hv 360 and the hardness of a head top portion is Hv 250 to 320.]

[12. A method for producing a pearlitic steel rail as defined in any of claims 1 to 6, said method comprising the steps of:

hot rolling a melted and cast steel to provide a steel rail, with said steel rail retaining rolling heat immediately after hot rolling;

cooling in an accelerated manner said steel rail retaining rolling heat immediately after hot rolling or cooling in an accelerated manner said steel rail heated for heat treatment, said accelerated cooling taking place from an austenite temperature at a cooling rate of more than 10° C./sec and up to 30° C./sec;

stopping said accelerated cooling at the point when pearlite transformation of a gage corner portion of said steel rail has proceeded at least 70%; and thereafter leaving said steel rail to cool;

wherein the hardness of said gage corner portion of said steel rail is at least Hv 360 and the hardness of a head top portion is Hv 250 to 320.]

[13. A method for producing a pearlitic steel rail as defined in claim 8, said method comprising the steps of:

hot rolling a melted and cast steel to provide a steel rail, with said steel rail retaining rolling heat immediately after hot rolling;

cooling is an accelerated manner said steel rail retaining rolling heat immediately after hot rolling or cooling in an accelerated manner said steel rail heated for heat treatment, said accelerated cooling taking place from an austenite temperature at a cooling rate of 1° to 10° C./sec.;

stopping said accelerated cooling at the point when the temperature of said rail reaches 700° to 500° C.; and thereafter leaving said steel rail to cool;

wherein the hardness within the range of a depth of 20 mm from the surface of a head portion of said steel rail is at least Hv 320.]

*14. A method for producing a pearlitic steel rail, having a good wear resistance, said method comprising the steps of:*

*hot rolling a melted and cast steel to provide a steel rail, with said steel rail retaining rolling heat immediately after hot rolling;*

*cooling in an accelerated manner said steel rail retaining rolling heat immediately after hot rolling, said accelerated cooling taking place from an austenite temperature at a cooling rate of more than 10° C./sec and up to 30° C./sec.;*

*stopping said accelerated cooling at the point when pearlite transformation of a gage corner portion of said steel rail has proceeded at least 70% and the temperature of the rail is 700° to 500° C.; and*

*thereafter leaving said steel rail to cool;*

*wherein the hardness of said gage corner portion of said steel rail is at least Hv 360 and the hardness of a head top portion is Hv 250 to 320, and*

*wherein said steel rail comprises 0.86 to 1.20%, in terms of percent by weight, of carbon, characterized in that the structure within the range of a depth of 20 mm from the surface of a rail head portion of said steel rail with said head surface being the start point is pearlite, a pearlite lamella space of said pearlite is not more than 100 nm, and a ratio of a cementite thickness to a ferrite thickness in said pearlite is at least 0.15.*

*15. A method for producing a pearlitic steel rail, having a good wear resistance, said method comprising the steps of:*

*hot rolling a melted and cast steel to provide a steel rail, with said steel rail retaining rolling heat immediately after hot rolling;*

*cooling in an accelerated manner said steel rail retaining rolling heat immediately after hot rolling, said accelerated cooling taking place from an austenite temperature at a cooling rate of more than 10° C./sec and up to 30° C./sec.;*

*stopping said accelerated cooling at the point when pearlite transformation of a gage corner portion of said steel rail has proceeded at least 70% and the temperature of the rail is 700° to 500° C.; and*

*thereafter leaving said steel rail to cool;*

*wherein the hardness of said gage corner portion of said steel rail is at least Hv 360 and the hardness of a head top portion is Hv 250 to 320,*

*wherein said steel rail comprises, in terms of percent by weight:*

*C: 0.86 to 1.20%,*

*Si: 0.10 to 1.00%,*

*Mn: 0.40 to 1.50%, and*

*the balance consisting of iron and unavoidable impurities, and*

*wherein said steel rail characterized in that the structure of said steel rail is pearlite, a pearlite lamella space of said pearlite is not more than 100 nm, and a ratio of a cementite thickness to a ferrite thickness in said pearlite is at least 0.15.*

*16. A method for producing a pearlitic steel rail, having a good wear resistance, said method comprising the steps of:*

*hot rolling a melted and cast steel to provide a steel rail, with said steel rail retaining rolling heat immediately after hot rolling;*

*cooling in an accelerated manner said steel rail retaining rolling heat immediately after hot rolling, said accelerated cooling taking place from an austenite temperature at a cooling rate of more than 10° C./sec and up to 30° C./sec.;*

*stopping said accelerated cooling at the point when pearlite transformation of a gage corner portion of said steel rail has proceeded at least 70% and the temperature of the rail is 700° to 500° C.; and*

*thereafter leaving said steel rail to cool;*

*wherein the hardness of said gage corner portion of said steel rail is at least Hv 360 and the hardness of a head top portion is Hv 250 to 320,*

*wherein said steel rail comprises, in terms of percent by weight:*

*C: 0.86 to 1.20%,*

*Si: 0.10 to 1.00%,*

*Mn: 0.40 to 1.50%, and*

*the balance consisting of iron and unavoidable impurities, and*

*wherein said steel rail characterized in that the structure within the range of a depth of 20 mm from the surface of a rail head portion of said steel rail with said head surface being the start point is pearlite, a pearlite lamella space of said pearlite is not more than 100 nm, and a ratio of a cementite thickness to a ferrite thickness in said pearlite is at least 0.15.*

*17. A method for producing a pearlitic steel rail, having a good wear resistance, said method comprising the steps of:*

*hot rolling a melted and cast steel to provide a steel rail, with said steel rail retaining rolling heat immediately after hot rolling;*

*cooling in an accelerated manner said steel rail retaining rolling heat immediately after hot rolling, said accelerated cooling taking place from an austenite temperature at a cooling rate of more than 10° C./sec and up to 30° C./sec.;*

*stopping said accelerated cooling at the point when pearlite transformation of a gage corner portion of said steel rail has proceeded at least 70% and the temperature of the rail is 700° to 500° C.; and*

*thereafter leaving said steel rail to cool;*

*wherein the hardness of said gage corner portion of said steel rail is at least Hv 360 and the hardness of a head top portion is Hv 250 to 320,*

*wherein said steel rail comprises, in terms of percent by weight:*

*C: 0.86 to 1.20%,*

*Si: 0.10 to 1.00%,*

*Mn: 0.40 to 1.50%,*

*at least one member selected from the group consisting of:*

*Cr: 0.05 to 0.50%,*

*Mo: 0.01 to 0.20%,*

*V: 0.02 to 0.30%,*

*Nb: 0.002 to 0.05%,*

*Co: 0.10 to 2.00%,*

*B: 0.0005 to 0.005%, and*

*the balance consisting of iron and unavoidable impurities, and*

*wherein said steel rail characterized in that the structure of said steel rail is pearlite, a pearlite lamella space in said pearlite is not more than 100 nm, and a ratio of a cementite thickness to a ferrite thickness in said pearlite is at least 0.15.*

*18. A method for producing a pearlitic steel rail, having a good wear resistance, said method comprising the steps of:*

*hot rolling a melted and cast steel to provide a steel rail, with said steel rail retaining rolling heat immediately after hot rolling;*

*cooling in an accelerated manner said steel rail retaining rolling heat immediately after hot rolling, said accelerated cooling taking place from an austenite temperature at a cooling rate of more than 10° C./sec and up to 30° C./sec.;*

*stopping said accelerated cooling at the point when pearlite transformation of a gage corner portion of said steel*

*rail has proceeded at least 70% and the temperature of the rail is 700° to 500° C.; and*

*thereafter leaving said steel rail to cool;*

*wherein the hardness of said gage corner portion of said steel rail is at least Hv 360 and the hardness of a head top portion is Hv 250 to 320,*

*wherein said steel rail comprises, in terms of percent by weight:*

*C: 0.86 to 1.20%,*

*Si: 0.10 to 1.00%,*

*Mn: 0.40 to 1.50%,*

*at least one member selected from the group consisting of:*

*Cr: 0.05 to 0.50%,*

*Mo: 0.01 to 0.20%,*

*V: 0.02 to 0.30%,*

*Nb: 0.002 to 0.05%,*

*Co: 0.10 to 2.00%,*

*B: 0.0005 to 0.005%, and*

*the balance consisting of iron and unavoidable impurities, and*

*wherein said steel rail characterized in that the structure within the range of a depth of 20 mm from the surface of a rail head portion of said steel rail with said head surface being the start point is pearlite, a pearlite lamella space of said pearlite is not more than 100 nm, and a ratio of a cementite thickness to a ferrite thickness in said pearlite is at least 0.15.*

*19. A pearlitic steel rail, having a good weldability and a good wear resistance, wherein a structure of said steel rail is pearlite, a pearlite lamella space of said pearlite is not more than 100 nm, and a ratio of a cementite thickness to a ferrite thickness in said pearlite is at least 0.15, said steel rail comprising, in terms of percent by weight:*

*C: 0.86 to 1.20%,*

*Si: 0.10 to 1.00%,*

*Mn: 0.40 to 1.50%,*

*Cr and the balance consisting of iron and unavoidable impurities,*

*said chemical components Si, Cr and Mn satisfy the relation Si+Cr+Mn=1.5 to 3.0% in terms of percent by weight and wherein a head portion of said steel rail does not contain a pro-eutectic cementite structure,*

*wherein the hardness of said steel rail within the range of a depth of 20 mm from the surface of a head portion of said steel rail is at least Hv 320,*

*and wherein said pearlitic steel rail is prepared in a process comprising:*

*cooling in an accelerated manner said steel rail retaining rolling heat immediately after hot rolling, said accelerated cooling taking place from an austenite temperature at a cooling rate of more than 10° to 30° C./sec;*

*stopping said accelerated cooling at the point when pearlite transformation of a gage corner portion of said rail has proceeded at 70% and the temperature of rail is 700° to 500° C.; and*

*thereafter leaving said steel rail to cool.*

*20. A pearlitic steel rail, having a good weldability and a good wear resistance, wherein a structure of said steel rail is pearlite, a pearlite lamella space of said pearlite is not more than 100 nm, and a ratio of a cementite thickness to a ferrite thickness in said pearlite is at least 0.15, said steel rail comprising, in terms of percent by weight:*

*C: 0.86 to 1.20%,*

*Si: 0.10 to 1.00%,*

*Mn: 0.40 to 1.50%,*

*Cr and the balance consisting of iron and unavoidable impurities,*

*said chemical components Si, Cr and Mn satisfy the relation Si+Cr+Mn=1.5 to 3.0% in terms of percent by weight and wherein a head portion of said steel rail does not contain a pro-eutectic cementite structure,*

*wherein the hardness of a gage corner portion of said steel rail is at least Hv 320 and the hardness of a head top of portion is Hv 250 to 320,*

*and wherein said pearlitic steel rail is prepared in a process comprising:*

*cooling in an accelerated manner said steel rail retaining rolling heat immediately after hot rolling, said accelerated cooling taking place from an austenite temperature at a cooling rate of more than 10° to 30° C./sec;*

*stopping said accelerated cooling at the point when pearlite transformation of said gage corner portion of said rail has proceeded at 70% and the temperature of rail is 700° to 500° C.; and*

*thereafter leaving said steel rail to cool.*

*21. The pearlitic steel rail, having a good weldability and a good wear resistance according to claim 19 or 20, wherein the content of Mn is,*

*Mn: 0.40 to 0.98%,*

*in terms of percent by weight.*

*22. The pearlitic steel rail, having a good weldability and a good wear resistance according to claim 19 or 20, comprising a weld joint portion.*

*23. The pearlitic steel rail, having a good weldability and a good wear resistance according to claim 22, wherein the weld joint portion has undergone flash butt welding.*

*24. A method for producing a pearlitic steel rail having a good wear resistance, said method comprising the steps of:*

*hot rolling a melted and cast steel to provide a steel rail, with said steel rail retaining rolling heat immediately after hot rolling;*

*cooling in an accelerated manner said steel rail retaining rolling heat immediately after hot rolling, said accelerated cooling taking place from an austenite temperature at a cooling rate of more than 10° C./sec and up to 30° C./sec.;*

*stopping said accelerated cooling at the point when pearlite transformation of a gage corner portion of said steel rail has proceeded at least 70% and the temperature of the rail is 700° to 500° C.; and*

*thereafter leaving said steel rail to cool;*

*wherein the hardness of said gage corner portion of said steel rail is at least Hv 360 and the hardness of a head top portion is Hv 250 to 320, and*

*wherein said steel rail comprises 0.86 to 1.20%, in terms of percent by weight of carbon, and wherein the structure of said steel rail is a pearlite, a pearlite lamella space of said pearlite is not more than 100 nm, and a ratio of a cementite thickness to a ferrite thickness in said pearlite is at least 0.15.*

* * * * *